(12) United States Patent
Rogers et al.

(10) Patent No.: US 9,111,134 B1
(45) Date of Patent: Aug. 18, 2015

(54) BUILDING SYSTEMS FOR TRACKING FACIAL FEATURES ACROSS INDIVIDUALS AND GROUPS

(71) Applicant: Image Metrics Ltd., Manchester (GB)

(72) Inventors: Michael Rogers, Manchester (GB); Kevin Walker, Sheffield (GB); Tomos G. Williams, Rhuthun (GB); Martin DeLa Gorce, Manchester (GB); Martin Tosas, Manchester (GB)

(73) Assignee: Image Metrics Limited, Manchester (GB)

( * ) Notice: Subject to any disclaimer, the term of this patent is extended or adjusted under 35 U.S.C. 154(b) by 319 days.

(21) Appl. No.: 13/795,882

(22) Filed: Mar. 12, 2013

Related U.S. Application Data

(60) Provisional application No. 61/650,262, filed on May 22, 2012.

(51) Int. Cl.
G06K 9/46 (2006.01)
G06K 9/00 (2006.01)

(52) U.S. Cl.
CPC .................................. *G06K 9/00302* (2013.01)

(58) Field of Classification Search
None
See application file for complete search history.

(56) References Cited

U.S. PATENT DOCUMENTS

| | | | |
|---|---|---|---|
| 5,016,282 A | 5/1991 | Tomono et al. | 382/2 |
| 5,659,625 A | 8/1997 | Marquardt | 382/118 |
| 5,854,850 A | 12/1998 | Linford et al. | 382/128 |
| 5,933,527 A | 8/1999 | Ishikawa | 382/190 |
| 6,091,836 A | 7/2000 | Takano et al. | 382/118 |
| 6,396,599 B1 | 5/2002 | Patton et al. | 359/1.9 |
| 6,502,583 B1 | 1/2003 | Utsugi | 132/200 |
| 6,556,196 B1 | 4/2003 | Blanz et al. | 345/419 |
| 6,580,810 B1 | 6/2003 | Yang et al. | 382/103 |
| 6,719,565 B1 | 4/2004 | Saita et al. | 434/94 |
| 7,099,510 B2 | 8/2006 | Jones et al. | 382/225 |
| 7,127,081 B1 | 10/2006 | Erdem | 382/103 |
| 7,619,638 B2 | 11/2009 | Walker, Jr. et al. | 345/269 |
| 7,634,103 B2 | 12/2009 | Rubinstenn et al. | 382/100 |

(Continued)

OTHER PUBLICATIONS

Cham et al., "A Multiple Hypothesis Approach to Figure Tracking," *Compaq Computer Corporation*, Cambridge Research Laboratory, Technical Report Series, CRL 98/8, 16 pages (Jul. 1998).
Chen et al., "Mode-based Multi-Hypothesis Head Tracking Using Parametric Contours," in *Proc. Autom. Face Gesture Recognition*, 6 pages (May 2002).
Cootes et al., "Active Appearance Models," *Proc. European Conference on Computer Vision*, vol. 2, pp. 484-498, 16 pages (1998).

(Continued)

*Primary Examiner* — Atiba O Fitzpatrick
*Assistant Examiner* — David Perlman
(74) *Attorney, Agent, or Firm* — Sunstein Kann Murphy & Timbers LLP

(57) ABSTRACT

Computer implemented methods for generating a non-transient record of feature locations and/or facial expression parameters characterizing a person's face. A video sequence of a specified individual person is received and a feature locator update model is applied to the video sequence. The feature locator update model is derived by defining a set of training images, generating a set of facial feature displacements for each training image with associated image sample vectors, and training a regularized linear regression which maps from image sample vectors to displacement vectors, wherein the regularization includes a spatial smoothness term within the shape-free sample space. A feature location and/or a facial expression parameter is then extracted, based on the feature update model, characterizing the location, and/or the expression, of the feature of the face of the specified individual person.

18 Claims, 19 Drawing Sheets

(56) References Cited

U.S. PATENT DOCUMENTS

| | | | |
|---|---|---|---|
| 7,916,904 B2 | 3/2011 | Suzuki et al. | 382/118 |
| 8,064,648 B2 | 11/2011 | Takano et al. | 382/117 |
| 8,082,926 B2 | 12/2011 | Yano et al. | 132/200 |
| 8,107,672 B2 | 1/2012 | Goto | 382/100 |
| 8,498,456 B2 | 7/2013 | Legagneur et al. | 382/118 |
| 2005/0169536 A1 | 8/2005 | Accomazzi et al. | 382/228 |
| 2006/0023923 A1 | 2/2006 | Geng et al. | 382/116 |
| 2006/0133672 A1 | 6/2006 | Li | 382/190 |
| 2008/0130961 A1 | 6/2008 | Kinoshita | 382/118 |
| 2009/0153569 A1 | 6/2009 | Park et al. | 345/474 |
| 2010/0111370 A1 | 5/2010 | Black et al. | 382/111 |
| 2010/0271368 A1 | 10/2010 | McNamara et al. | 345/420 |
| 2010/0302258 A1 | 12/2010 | Epps et al. | 345/474 |
| 2011/0110561 A1 | 5/2011 | Havaldar | 382/103 |
| 2012/0130717 A1 | 5/2012 | Xu et al. | 704/258 |
| 2012/0308123 A1 | 12/2012 | Jo et al. | 382/159 |
| 2013/0148852 A1 | 6/2013 | Partis et al. | 382/103 |
| 2013/0235045 A1 | 9/2013 | Corazza et al. | 345/473 |
| 2014/0022249 A1 | 1/2014 | Ye et al. | 345/420 |
| 2014/0035901 A1 | 2/2014 | Chen et al. | 345/419 |
| 2014/0307063 A1 | 10/2014 | Lee | 348/51 |

OTHER PUBLICATIONS

Gao et al., "A Review of Active Appearance Models," *IEEE Trans. Syst. Man Cybern. C Appl. Rev.*, vol. 40, No. 2, pp. 145-158 (Mar. 2010).

Horn et al., "Determining Optical Flow," *Massachusetts Institute of Technology, Artificial Intelligence Laboratory*, Memo No. 572, 28 pages (Apr. 1980).

Liao et al., "Learning Multi-scale Block Local Binary Patterns for Face Recognition," Center for Biometrics and Security Research & National Laboratory of Pattern Recognition, Institute of Automation, Chinese Academy of Sciences, pp. 828-837 (2007).

Prabhu et al., "Automatic Facial Landmark Tracking in Video Sequences using Kalman Filter Assisted Active Shape Models," *ECCV '10 Proceedings of the 11$^{th}$ European conference on Trends and Topics in Computer Vision* —vol. Part I, 14 pages (2010).

Viola et al., "Robust Real-time Object Detection," *2$^{nd}$ International Workshop on Statistical and Computational Theories of Vision—Modeling, Learning, Computing, and Sampling*, 25 pages (Jul. 2001).

Dornaika et al. "Fitting 3D face models for tracking and active appearance model training," *Image Vision Comput.*, vol. 24, pp. 1010-1024 (2006).

BUILDING SYSTEMS FOR TRACKING FACIAL FEATURES ACROSS INDIVIDUALS AND GROUPS

The present application claims the priority of U.S. Provisional Patent Application Ser. No. 61/650,262, filed May 22, 2012, and incorporated herein by reference.

TECHNICAL FIELD

The present invention relates to automatic analysis of facial expression, and, more particularly, to analysis of facial expression in an unconstrained consumer environment.

BACKGROUND ART

Facial expression measurement has become extremely valuable in numerous fields such as performance driven facial animation in media production, behaviour analysis, cognitive studies, product design analytics, and measuring emotional responses to advertising.

Methods heretofore developed for measuring facial expressions are typically limited to professional applications insofar as they require constrained capture environments, specialized hardware, trained operators, physical facial markers and long setup times. These requirements make such technologies impractical for some professional and most consumer applications.

If, however, requirements for specialised equipment and environments were to be overcome, measuring facial expressions from video would become well-suited to consumer-based applications. Video cameras are commonly integrated into many consumer electronics, such as mobile phones, laptops, tablet computers, game consoles and televisions and therefore are already available to a large proportion of the consumer population. Measurement of facial expression from video is much less intrusive than other methods such as optical facial motion capture, for example, in US Patent Application 2011/011056, to Havaldar, entitled "Facial Motion Capture Using Marker Patterns That Accommodate Facial Surface," which requires subjects to have several dozen physical markers applied to the face.

Methods for tracking facial features from video exist in the prior-art. For example, Active Appearance Models (AAMs) as taught, for example, in Cootes, et al., "*Active appearance models*", Proc. European Conf. on Computer Vision, vol. 2, pp. 484-98, (Springer, 1998) (hereinafter, "Cootes et al., (1998), incorporated herein by reference), are a form of tracker which captures the variation in position and appearance of facial features in a training set of example images, and apply these to the tracking of facial features of subjects not included in the training set. If the identity of the target subject for analysis is unknown, these methods generally involve training a generic tracker that will attempt to work on the entire population. This invariably results in the system failing or underperforming on many specific individuals due to the models inability to generalise to the entire population. It is possible retrain the tracker to include these specific individuals but this is impractical for many applications due the length of time and complexity of the training process.

SUMMARY OF EMBODIMENTS OF THE INVENTION

In accordance with various embodiments of the present invention, a system and methods are provided that may be used for applications such as performance driven facial animation, behaviour analysis or understanding a person's response to advertising or other visual information.

A first stage robustly locates the position of physically meaningful facial features in each image frame. The location of these features can be used in a wide variety of applications including, but not restricted to, photographic and video manipulation, facial recognition, gaze analysis, product design analytics and attention measurement. A second phase uses a calibrated projected fitting approach to fit a 3D representation of the subject's face to the feature locations in each frame resulting expression measurements. Integral to certain embodiments of the system and methods is the concept of using information captured during a calibration phase. Calibration takes place during a constrained period of the subject's performance, ideally consisting of the subject facing the camera and displaying a neutral facial expression. The use of this calibration information results in increased robustness and improved accuracy of the feature location and expression measurements in a subsequent unconstrained facial performance. This step also increases the percentage of the population that the system works on and decouples the extracted expression measurements from the identity of any specific individual.

Aspects of various embodiments of the invention include, without limitation:

1. A calibration step which improves both feature tracking and expression measurement stages, by capturing information about the specific individual's facial appearance and shape.
2. The use of a novel spatial regularization when training a feature locator update model that produces update matrices where the coefficients associated to neighbouring pixels in the image have similar values.
3. The use of optical flow between a particular image of a subject showing a neutral expression and each image within a video sequence, in order to tailor a generic feature tracker, thereby improving performance of a tracker as applied to a specific individual. This is achieved without any additional computation cost over the basic update model equation.
4. A calibrated expression measurement module which ensures that expression measurements are not contaminated by varying subject identity and can therefore be used as a measure of absolute facial expression across subjects.

In some embodiments of the invention, real-time avatar animation is produced from an individual's facial performance in an unconstrained consumer environment. The feature location and expression measurement stages are used as input to an avatar animation module which maps expression measurements onto avatar controls. Due to the robust and generic characteristics of the measurement system, this animation production process may be advantageously deployed in an unrestricted consumer environment targeting a large proportion of the population. This is an extremely challenging use-case to which the system may be ideally tailored.

In a preferred embodiment of the invention, a method is provided for generating a non-transient record embodying a measure of a location of a feature of a face of a person. The method has steps of:

a. receiving a video sequence that constitutes a physical record of the face of a specified individual person;
  b. applying a feature locator update model to the video sequence, the feature locator update model derived by steps of:
    i. defining a set of training data consisting of training images with associated facial feature locations;

ii. generating a set of facial feature displacements for each training image with associated image sample vectors; and iii. training a regularized linear regression which maps from image sample vectors to displacement vectors, wherein the regularized linear regression is characterized by regularization that includes a spatial smoothness term within the shape-free sample space; and c. extracting a feature location, based on the feature update model, characterizing the location of the feature of the face of the specified individual person; and d. storing the feature location to the non-transient record.

In alternate embodiments of the invention, other methods are provided for generating non-transient records that have additional steps of:

measuring facial feature locations on a set of images containing a specific individual. These methods have steps of:

e. extracting a facial expression parameter, based on the feature update model, characterizing the expression of the feature of the face of the specified individual person; and f. storing the facial expression parameter to the non-transient record.

In accordance with other embodiments of the present invention, the feature locator update model may be trained on the basis of a plurality of human subjects, and the basis of calibration images of each of the plurality of human subjects.

In further embodiments of the present invention, the methods may have additional steps of:

a. training the feature locator update model from the plurality of subjects in such a manner as to incorporate information from calibration images of each of a plurality of subjects;

b. obtaining a calibration image of a specific subject;

c. tailoring the feature locator update model to the specific individual using the captured calibration image; and d. applying the tailored feature locator to the video sequence of the specified individual person.

The feature locator update model may be derived using a further step of computing matrices representing the contribution of optical flow to an update equation using a set of annotated training images during an offline training phase. The feature locator update model may also be derived using a further step of combining a vector of calibration samples said matrices to "bake" the optical flow calculation into the feature locator update model in such a manner as to retain an original computational cost.

In accordance with yet further embodiments of the present invention, there are additional steps of:

a. creating a plurality of expression extractor containing controls representing both identity and expression variation;

b. fitting, in a fitting process, 3D pose, identity and expression parameters to features from a specified individual person in a calibration pose;

c. fixing a set of identity controls to produce a tailored person-specific expression extractor; and d. applying the above fitting process on a person-specific expression extract to the video sequence that constitutes a physical record of the face of a specified individual person to produce facial expression parameters, wherein the facial expression parameters represent facial feature locations which are uncontaminated by identity variation between individuals.

Any of the foregoing computer-implemented methods may be performed on a mobile device, or a smart TV, for example. They may include measuring an expression of the person in response to pre-rendered video footage or in response to dynamically rendered display content, including a software display.

In accordance with various embodiments of the present invention, there may be additional steps of producing real-time pre-visualisation of character animation during performance capture in media generation, or creating video content containing avatar animation, or creating character animation in real-time.

In accordance with another aspect of the present invention, a non-transitory computer readable medium is provided for use on a computer system for storing computer-readable program code. The computer readable program code has:

a. a computer code module for receiving a video sequence that constitutes a physical record of the face of a specified individual person;

b. a computer code module for applying a feature locator update model to the video sequence;

c. a computer code module for defining a set of training data consisting of training images with associated facial feature locations;

d. a computer code module for generating a set of facial feature displacements for each training image with associated image sample vectors;

e. a computer code module for training a regularized linear regression which maps from image sample vectors to displacement vectors, wherein the regularized linear regression is characterized by regularization that includes a spatial smoothness term within the shape-free sample space, thereby generating the feature locator update model;

f. a computer code module for extracting a feature location, based on the feature update model, characterizing the location of the feature of the face of the specified individual person; and g. a computer code module for storing the feature location to a non-transient medium.

In other embodiments of the non-transitory computer readable medium, there may be additional modules:

h. a computer code module for extracting a facial expression parameter, based on the feature update model, characterizing the expression of the feature of the face of the specified individual person; and i. a computer code module for storing the facial expression parameter to the non-transient record.

BRIEF DESCRIPTION OF THE FIGURES

The foregoing features of the invention will be more readily understood by reference to the following detailed description, taken with reference to the accompanying figures, in which:

FIG. 7A shows an original image together with the corresponding image-space sample locations as white dots, while

FIG. 14A employs uncalibrated specific individual expression measurement, FIG. 14B employs generic subject expression and ID measurement, and FIG. 14C employs calibrated specific individual expression measurement, all in accordance with embodiments of the present invention.

DETAILED DESCRIPTION OF EMBODIMENTS OF THE INVENTION

Definitions

As used in this description and in the appended claims, the term "image" refers to any multidimensional representation, whether in tangible or otherwise perceptible form or otherwise, whereby a value of some characteristic is associated with each of a plurality of locations corresponding to dimensional coordinates of an object in physical space, though not necessarily mapped one-to-one thereonto. Thus, for example, the graphic display of the spatial distribution of some feature, such as temperature, in one or more colors constitutes an image. So, also, does an array of numbers in a computer memory or holographic medium. Similarly, "imaging" refers to the rendering of a stated physical characteristic in terms of one or more images.

As used herein and in any appended claims, the term "optical flow" refers to an estimation of motion based on assumptions of the temporal appearance consistency of features in a visual scene given small feature displacements. Optical flow has been formulated, for example, in Horn & Schunck, *Determining Optical Flow, MIT Artificial Intelligence Laboratory Memo No.* 572 (1980), available at http://hdl.handle.net/1721.1/6337.

Description of Embodiments

Figure 1:
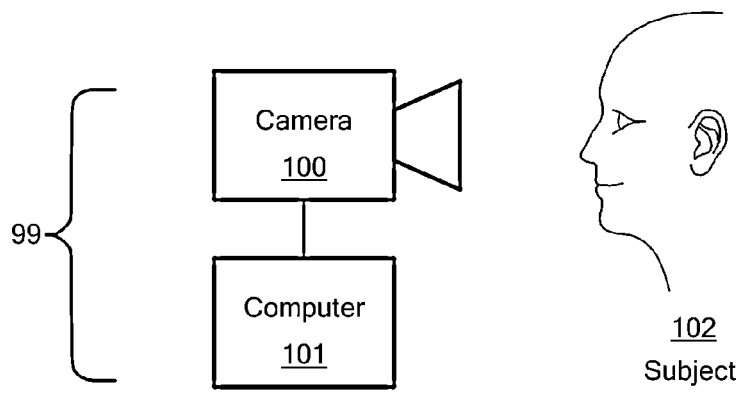
FIG. 1 schematically depicts basic components of a facial expression measurement system, in accordance with an embodiment of the present invention.

A system 99 that may be employed for practice of embodiments of the present invention is first described with reference to FIG. 1. A monocular video camera 100 is positioned to capture the face of a subject 102 during a facial performance, and a computational device 101 contains a central processing unit 607 and memory 604 (shown in FIG. 17). The memory is capable of storing all of the entities (such as the trackers 203 and Expression Extractor 204) and data of the system (such as the training data 201, feature locations 210 and expression measurements 209). The memory also contains a program in the form of a series of instructions which, when executed by the central processing unit, and applied to the data and entities, track the location of the facial features in the images captured by the camera and measure the expression of the subject. The system 99 is configured so that the video of the subject's performance is captured by camera 100, and streamed to computational device 101 for processing and generation of the facial feature locations and expression measurements in real-time. In one embodiment of the invention, the computational device 101 transforms the expression measurements into movements and animation of a digital character. In another embodiment of the invention, the feature locations and expression measurements are stored within the computational unit's memory for off-line analysis, by computational device 101 or by another system.

Real-Time Expression Measurement Process

Methods for generating Tracked Feature Locations 210 and Expression Measurements 209 from images of a subject's performance 206 captured by camera 100 are now described with reference to the flowchart depicted in FIG. 2. Methods in accordance with embodiments of the present invention may be divided into two phases: an Offline Phase 200 involving the training and construction of the Tracker 203; and a Real-Time Phase 205, which uses the Tracker 203 and Expression Extractor 204 to generate the expression measurements and tracked feature locations. Offline Phase 200 is executed prior to Real-Time Phase 205, but need not be executed on the same computational unit since its generated output, the tracker 203, may be stored on digital memory and transferred to other computational units. Once constructed, Trackers 203 may be used for any number of Real-Time Phase executions.

Offline phase 200, described in detail below, entails training the trackers using training data which consists of images of the features to be tracked, annotated with the locations of the features.

Figure 5:
FIG. 5 shows expression measurements and feature locations on a human head.

During the Real-Time Phase 205, the Tracker 203 and Expression Extractor 204 provide a stream of feature locations and expression measurements for each image of the captured video sequence. Each captured image is processed by the Tracker 203 in module 207, to produce the location of all features 210. In addition, the output generated by module 207 for each image is transformed by the Expression Extractor 204 into measurements of the subject's expression 209. The real-time processes are repeated for each frame of the captured video producing a continuous stream of tracked feature locations and expression measurement which may be further processed in real-time, e.g. for real-time digital character animation, or saved for subsequent processing. FIG. 5 shows an example of feature locations and expression measurements applied to a digital character for a single frame of video input.

Training the Tracker

Figures 3, 4:
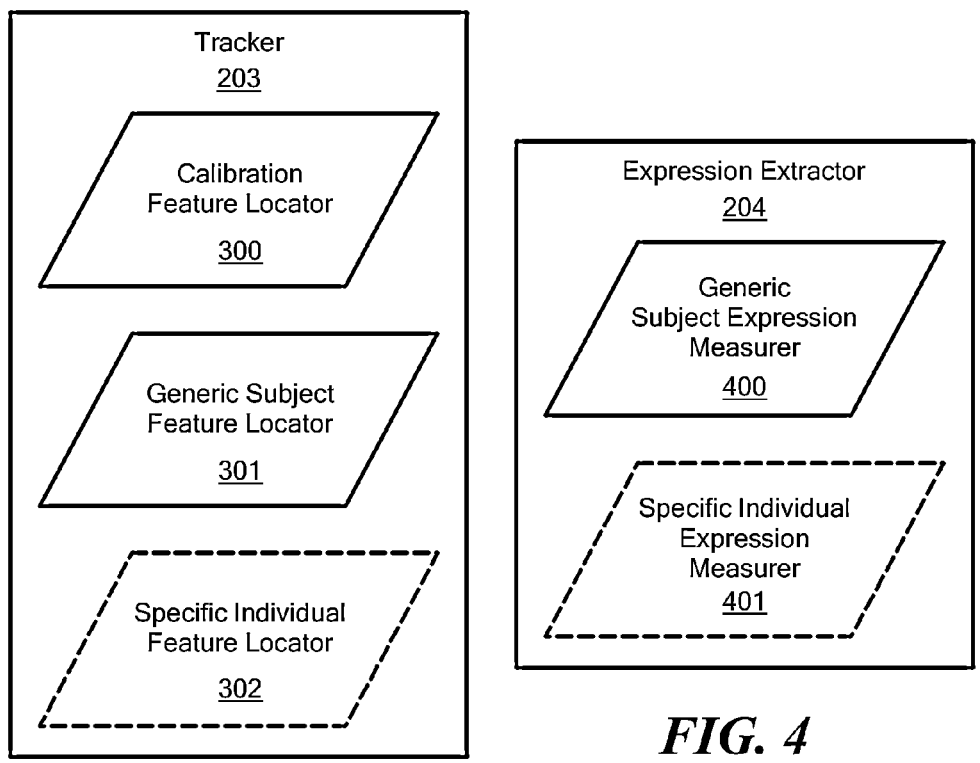
FIG. 3 shows components of a tracker, in accordance with embodiments of the present invention.
FIG. 4 shows components of an expression extractor, in accordance with embodiments of the present invention.

In Offline phase 200, module 202 generates a Tracker object 203, as described in greater detail with reference to FIG. 3. As shown in FIG. 3, Tracker 203 may have three feature locator components: Calibration Feature Locator 300, Generic Subject Feature Locator 301 and Specific Individual Feature Locator 302. Each of the foregoing components have the same basic structure, however they are tailored to different phases of the feature tracking process. The calibration and generic subject feature locators 300 and 301 are created during Offline Phase 200, while the specific individual feature locator 302 is created by module 900 during the calibration phase as further discussed below with reference to FIGS. 9 and 10.

Figure 2:
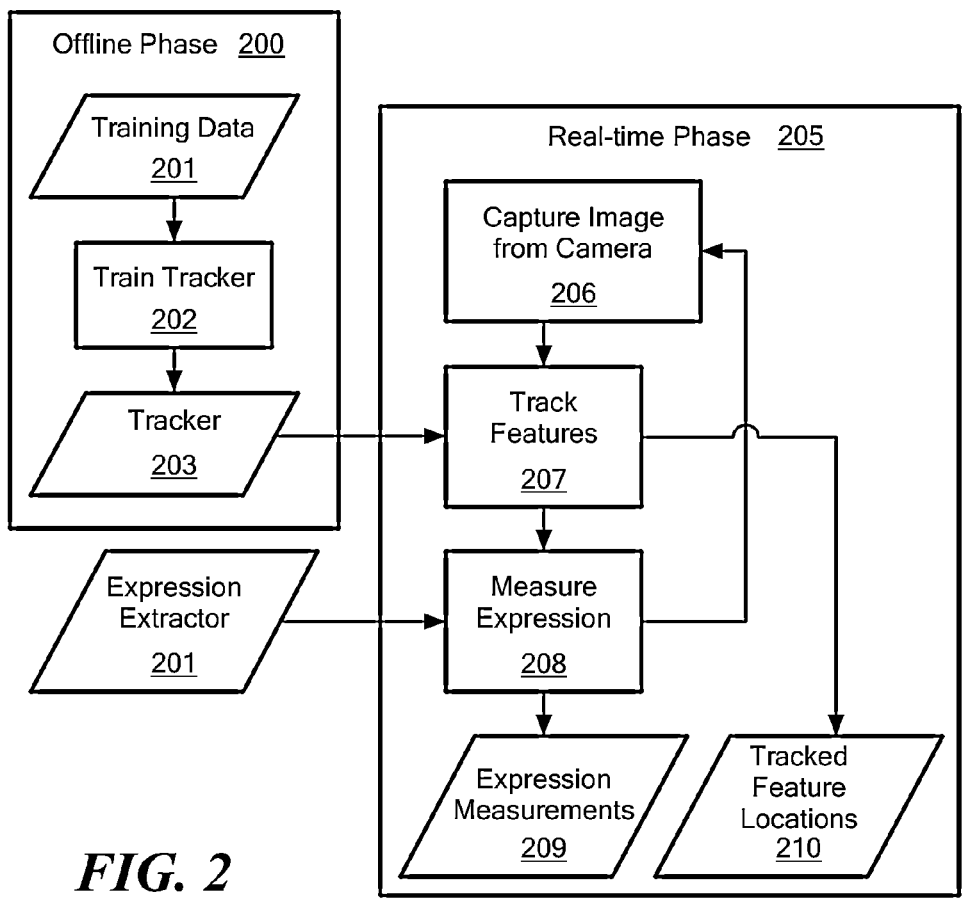
FIG. 2 shows a flowchart of two phases of a real-time expression measurement process, in accordance with embodiments of the present invention.
Figure 8:
FIG. 8 depicts an example of a training image, in accordance with an embodiment of the present invention.

Training a feature locator is implemented on the basis of a set of annotated example images denoted Training Data 201 in FIG. 2 A consistent set of feature locations is defined in each image to represent the shape of the deformable object to be tracked. These features should represent unique, salient features which ideally are present throughout the entire data set. FIG. 8 depicts an example of a training image where the white dots indicate the position of one possible set of facial features. Any choice of a particular set of features is within the scope of the present invention. The set of training images can be chosen to represent the variation in the shape and appearance of the object to be tracked and can therefore tailor the feature locator to a specific application. For example, if the set of training images contains a wide variety of subjects, each with a neutral facial expression, the resulting feature locator will be capable of finding features in a wide variety of subjects with a neutral expression, but will not be capable of identifying features in images of subjects with other facial expressions. In general, the more specific a set of training images are to a particular appearance, the more accurate the resulting feature locator will be in that scenario. However the locator will perform poorly in other scenarios. A locator trained on a very widely varying image set will perform adequately on a wide variety of data but will not give accurate locations over that data set. In general, for an individual feature locator, there is a trade-off between feature locator generality/robustness and accuracy. Based on these observations, Tracker 203 uses a combination of feature locators to produce robust and accurate results over a very wide range of image appearance.

Figure 6:
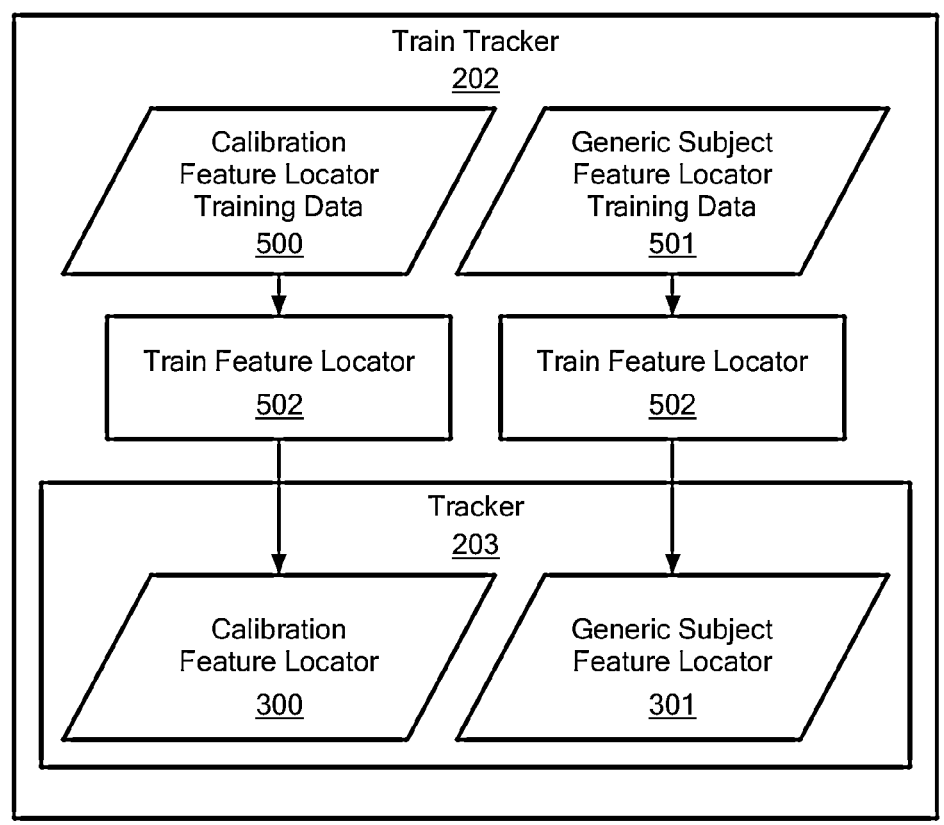
FIG. 6 shows a flowchart of a preferred embodiment of the invention, where calibration feature locator training data is selected to include a wide variety of subjects' facial appearance, but with each subject's images limited to contain only neutral expression. Generic subject feature locator training data is selected to include a wide variety of subjects' facial appearance with no limitation on expression content, in accordance with embodiments of the present invention.

FIG. 6 shows a flowchart of a preferred embodiment of the invention, where calibration feature locator training data 500 is selected to include a wide variety of subjects' facial appearance, but with each subject's images limited to contain only neutral expression. This data results in the calibration feature locator 300 being capable of robustly identifying neutral expression over a wide variety of subjects. In contrast, the generic subject feature locator training data 501 is selected to include a wide variety of subjects' facial appearance and a wide variety of expressions. This produces a generic subject feature locator 301 which is robust to many subject identities and facial expression variations, but that may not be accurate for any given specific individual. Both feature locators are trained in the same way using module 502, as now described in detail.

Training a Feature Locator

Given an initial set of feature locations in an image which may not lie on the desired physical locations, a feature locator will predict the direction and magnitude of an update step that will move the feature locations closer to the desired physical locations. Iterating this process will move the feature locations progressively closer to the desired result until convergence. Many techniques in the prior-art utilise an approach such as this, for example AAIVIs, as described in Cootes, et al., (1998). Feature locators typically base this update step on a shape-normalised sample taken from the image with reference to the current feature points. Methods of achieving this sampling are well known in the field.

In the present description and in any appended claims, a set of feature locations may be referred to as a "shape," and the desired set of feature locations as defined by the training set may be referred to as the "solution." For simplicity, the notation will be restricted to the application of methods to single channel images, however extension to multi-channel images is straight-forward and is encompassed within the scope of the invention.

In order to learn the relationship between the image sample at a given shape and the displacement from the solution, a linear regression model is created. This model is referred to as the "Update Model." Given a matrix of 2D feature locations $$X = \begin{bmatrix} x_1 & \cdots & x_N \\ y_1 & \cdots & y_N \end{bmatrix}$$

and the corresponding sample vector S, the update model is defined to be of the form:

$$U(X,S) = X + [B_0 + B_1 S + B_2 [X]_{2N \times 1}]_{2 \times N} \quad \text{(Eqn. 1)}$$

where $[X]_{M \times N}$ denotes a matrix of size M×N constructed of the elements of X read in a column major order (i.e., with the columns listed in sequence), for example $[X]_{2N \times 1}$, reshapes the matrix X, of size 2×N, into a vector of size 2N×1. $[X]_{M \times N}$ may also be referred to herein as a "reshape operator." The vector $B_0$ and the matrices $B_1$ and $B_2$ define the update model and are learnt from annotated data. X and U are typically represented in an appropriately aligned model space, in which case, U is therefore mapped back into image space after this update has been calculated.

Training data 201 define a set of $N_E$ training shapes $X_1, \ldots, X_{N_E}$, where each training shape $X_i$ is a matrix of size 2×N. The vector $B_0$ and matrices $B_1$ and $B_2$ are to be found that minimize the error:

$$E = \sum_{i=1}^{N_E} \|U(d_i, S_i) - X_i\|^2,$$

where $d_i$ is a randomly perturbed shape that deviates slightly from the ground truth $X_i$, and $S_i$ is the corresponding sample vector. The error can be rewritten explicitly using $B_0$, $B_1$ and $B_2$ as follows:

$$E = \sum_{i=1}^{N_E} \|B_0 + B_1 S_i + B_2[d_i]_{2N \times 1} - \Delta_i\|^2,$$

where $\Delta_i = [X_i - d_i]_{2N \times 1}$.

The regression error may be reformulated in a more compact manner:

$$E = \|\Delta - BD\|^2,$$

where:

$$B = [B_0^T, B_1^T, B_2^T]^T;$$

$\Delta = [\Delta_1, \ldots, \Delta_{N_E}]$, a matrix of size $2N \times N_E$ denoted the output data matrix; and $D = [D_1, \ldots, D_{N_E}]$, with $D_i = [1 S_i^T [d_i]_{1 \times 2N}]^T$.

Minimization of E with respect to B leads to $B = C \Sigma_D^{-1}$, where $C = \Delta D^T$ and the data covariance matrix $\Sigma_D = DD^T$. B may be computed without inversion of the sample covariance matrix $\Sigma_D$ by, instead, solving the following linear system: $B \Sigma_D = C$. However, the matrix $\Sigma_D$ is in general not well-conditioned and the estimated matrix B can be sensitive to small amounts of variation in the training data matrix D and in particular to the samples vectors $S_i$. This can result in a poor generalization of the update model to unseen images. One potential solution to this problem is to reduce the dimensionality of the samples vectors by projecting them onto a smaller linear space using principle component analysis (PCA). This approach is used for example by AAMs, as taught in Cootes, et al., (1998).

In accordance with preferred embodiments of the invention, more effective generalization can be achieved if explicit regularization is employed in the minimization of E. The matrix B is estimated using a cost function that combines the previously defined cost with a regularization term:

$$E_r = \|\Delta - BD\|^2 + R(B_1).$$

Figure 7B:
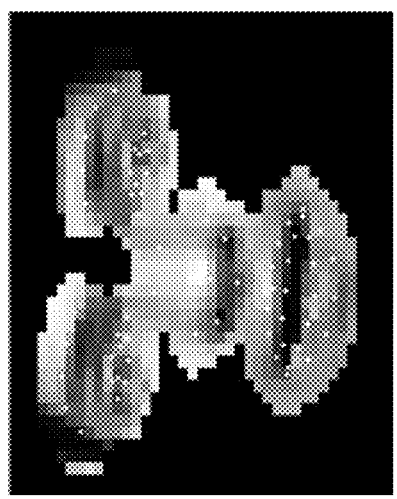
FIG. 7B shows an example of a shape-free image together with corresponding image-space sample locations, in accordance with an embodiment of the present invention.

A sample vector $S_i$ can be represented in a normalized frame called a shape-free image. FIG. 7B shows an example of a shape-free image of this type together with the corresponding image-space sample locations. In the same way, the coefficients of the update model B, (which may also be referred to, herein, as the "update matrix") can also be interpreted in this shape-free space. In general, a model with a smooth spatial variation of coefficient values in this space will produce better generalisation and accuracy than a model with a more random distribution of coefficient magnitudes. Models with this characteristic are also more robust to imaging conditions such as noise and poor lighting. This smoothness can be thought of as introducing a characteristic to the model where neighbouring parts of image appearance affect the update step in a smooth and continuous manner, which will produce smooth and well regularised model convergence.

In accordance with preferred embodiments of the present invention, the aforesaid smooth spatial variation of coefficient values facilitates a novel regularization scheme that produces update matrices where the coefficients associated to neighbouring pixels in the shape free image have similar values. In order to formulate the regularization, a specialized masked convolution operator $\otimes_s$ is defined as follows:

$$c = a \otimes_s b \Leftrightarrow$$

$$\begin{cases} m(i,j) = 1 \text{ if } \bigcup_{k=1}^{M} \bigcup_{l=1}^{N} (i-k+\lfloor M/2 \rfloor, j-l+\lfloor N/2 \rfloor) \subset G_s, \quad 0 \text{ else} \\ c(i,j) = m(i,j) \sum_{k=1}^{M} \sum_{l=1}^{N} b(k,l) a(i-k+\lfloor M/2 \rfloor, j-l+\lfloor N/2 \rfloor) \end{cases}$$

where the shape free image has dimensions $M \times N$, and $m(i,j)$ is a masked region of the shape-free image equal zero when the convolution kernel b does not fully overlap with points in the set of shape free sample locations G.

A matrix-valued function A is introduced, where A takes a 2D matrix a as its argument. The matrix $\Lambda(a)$ is a sparse matrix defined as the square matrix of size $N_s \times N_s$ such that the following holds:

$$\forall S \in \mathfrak{R}^{\infty \times N_s}: \Lambda(a)[S]_{N_s \times 1} = [I_{sf}^{-1}(I_{sf}(S) \otimes_s a)]_{N_s \times 1},$$

where $I_{sf}(S)$ constructs a shape-free image from a vector of samples; and $I_{sf}^{-1}(S)$ constructs a vector of samples from a shape-free image.

Figure 7A:
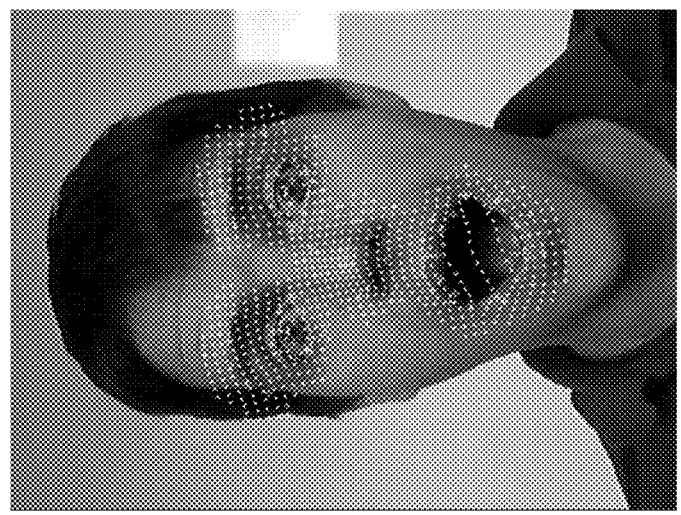

FIGS. 7A and 7B illustrate the construction of the shape-free image. FIG. 7A shows the original image together with the corresponding image-space sample locations as white dots, the image values at which form the vector S. The larger white crosses indicate the facial feature locations for this image. 7B shows an example of the shape-free image for this vector $I_{sf}(S)$.

Matrix $\Lambda(a)$ simply restates as a matrix product the following set of operations:
reconstruct a shape free image from a set of sample intensities values S
convolve the reconstructed image by a 2D kernel matrix a
resample the matrix of intensities of the convolved image into a $1 \times N_s$ single column vector, taking only values from the sample locations $G_s$.

Matrices $M_x$, $M_y$ and $M_{xy}$ are now defined as three sparse matrices:

$$M_x = \Lambda([-1,1])$$

$$M_y = \Lambda([-1,1]^T).$$

$$M_{xy} = \Lambda([-1,1]^T[-1,1])$$

The matrix $M_x$ computes the gradients in the x dimension of the shape-free image directly from a matrix S of intensity values. Therefore each row of the matrix $M_x B_1$ corresponds to the set of derivatives in the x direction of the update coefficient shape-free image reconstructed from the corresponding row in $B_1$. Similarly $M_y B_1$ contains the derivatives in the y direction of the update coefficient shape-free images and $M_{xy} B_1$ contains the second order partial derivative $\partial x \partial y$ of the reconstructed update coefficient shape-free images.

The regularization term is rewritten $$R(B_1) = \|\Gamma^{1/2} B_1\|^2$$

with $\Gamma = \lambda_x M_x^T M_x + \lambda_y M_y^T M_y + \lambda_{xy} M_{xy}^T M_{xy}$.

The matrix minimizing $E_r(B)$ may then be obtained by solving the following linear system:

$$(\Sigma_D + \Gamma_2) B = C$$

with $$\Gamma_2 = \begin{bmatrix} 0_{1\times 1} & 0_{1\times 3N_s} & 0_{1\times 2N} \\ 0_{3N_s\times 1} & \Gamma & 0_{3N_s\times 2N} \\ 0_{2N\times 1} & 0_{2N\times 3N_s} & 0_{2N\times 2N} \end{bmatrix}.$$

Here $\Gamma_2$ represents a zero-padded version of $\Gamma$ which regularises only the sub matrix of B corresponding to $B_1$.

Locating Features

Module 901 (shown in FIG. 9) shows the process of determining the location of features in each captured image in the sequence. The facial features for each frame of video are located by generating multiple possible solutions, or hypotheses, each containing the location for all features, then choosing the best hypothesis and determining whether or not the tracking has been successful or not for that frame. Each hypothesis is generated by defining an initial set of locations for each feature, and then refining each hypothesis with a feature locator.

Either (or both) of two methods may be used to generate initial hypotheses for the location of features in a given frame (module 902); locations based on the detected position of the face within the current frame and locations of the features in previous frames.

In cases where no valid historical information exists for the expected position of the features (for example, the first frame, or when features were not successfully located in the previous frame, or where such information would not be appropriate such as during a user triggered calibration phase 900), features are placed based on the detected position of the face within the frame. The frame is analysed using a face detection system. Face detection systems that may be used within the scope of the present invention include those described by Liao, et al. in "*Learning Multi-scale Block Local Binary Patterns for Face Recognition,*" International Conference on Biometrics (ICB), LNCS 4642, pp. 828-837 (2007), which is incorporated herein by reference. Face detection systems typically provide a rectangular box in the image within which a face is likely to reside. The tracker contains information on the average position of each feature, relative to the size and location of this face detection box, and places one hypothesis, containing all of the features required to be tracked, at these average locations. In addition, the tracker contains information on a set of other possible locations for each feature within a face detection box, based on the variation in dimensions of people's facial features and the range of motion of the features typical in a sequence of an actor's performance. This information is used to place further multiple hypotheses for each feature designed to encompass the expected range of facial dimensions and expressions.

During normal feature tracking of a video sequence, methods in accordance with the present invention utilize the knowledge that a feature's location will normally not move significantly between successive frames of video, by using its location in previous frames as an initial estimation for its location in the current frame. In this way, the set of feature locations in previous frames is used to generate extra hypotheses in the set. In the preferred embodiment, the number of hypotheses generated from previous frames is limited to a user-specified maximum.

Figure 9:
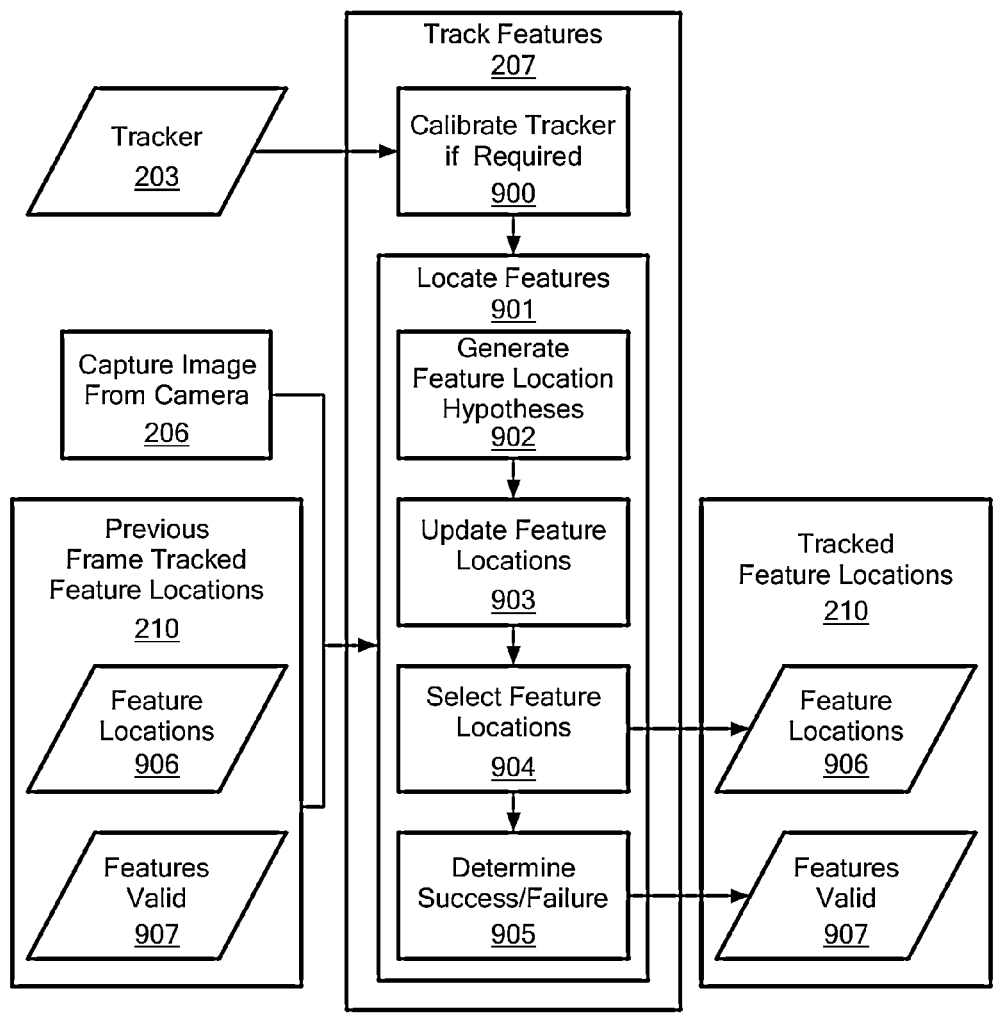
FIG. 9 shows a flowchart depicting the tracking of features, in accordance with embodiments of the present invention.

With further reference to FIG. 9, in module 903, the tracker's update model is used to iteratively improve each feature location hypothesis independently using Eqn 1. which is defined in the section entitled "Calibrating the Tracker." The update model equation is applied iteratively for a pre-defined number of iterations, limited by the time interval required to achieve real-time tracking of the input images.

Given a number of refined hypotheses, each of which defines a location for each of the facial features, module 904 is used to select a single hypothesis as the output for the feature locations on the current frame. This is achieved by calculating a confidence measure for each possible solution and choosing the solution with the highest confidence which is set as the output feature locations 906. In one embodiment of the invention, a statistical shape and appearance model, such as that taught by AAMs, is used to capture the appearance of the training data and model its appearance using a Principle Component Model, represented by the mean appearance, $A_0$, plus a linear combination of m appearance bases $\{A_i\}$ $$A = A_0 + \sum_{i=1}^{m} \lambda_i A_i,$$

where the coefficients $\{\lambda_i\}$ are the appearance parameters. The confidence is calculated as the Pearson's correlation between the original appearance, A, and the appearance synthesised from the appearance model parameters, $A_\lambda$.

$$C_a = \mathrm{corr}(A, A_\lambda).$$

In addition to a set of feature locations for each image captured, the tracker provides information on whether or not the feature locations constitute a successful result for each captured image to enable the expression measurer to decide whether or not the result should be used as an initial hypothesis for subsequent frames and to enable to Expression Measurer to decide whether or not to use the result. In preferred embodiments of the invention, module 905 defines minimum confidence threshold measure, and any tracking result whose confidence is below this threshold is deemed to be a failure. The outcome of this module is recorded as feature validity 907 for use in the processing of the next frame of input.

Calibrating the Tracker

Figure 10:
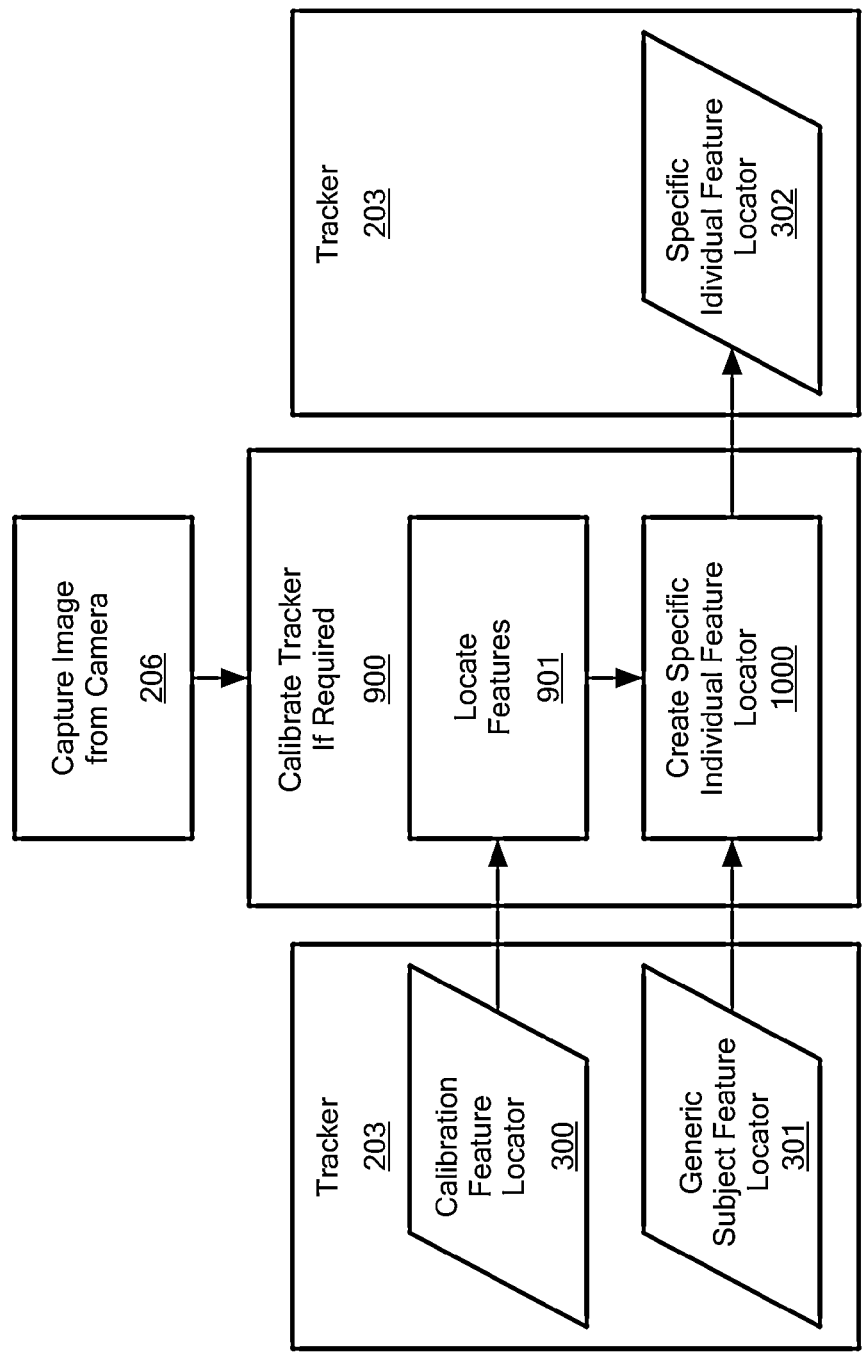
FIG. 10 shows a flowchart depicting tracker calibration, in accordance with embodiments of the present invention.
Figure 11B:
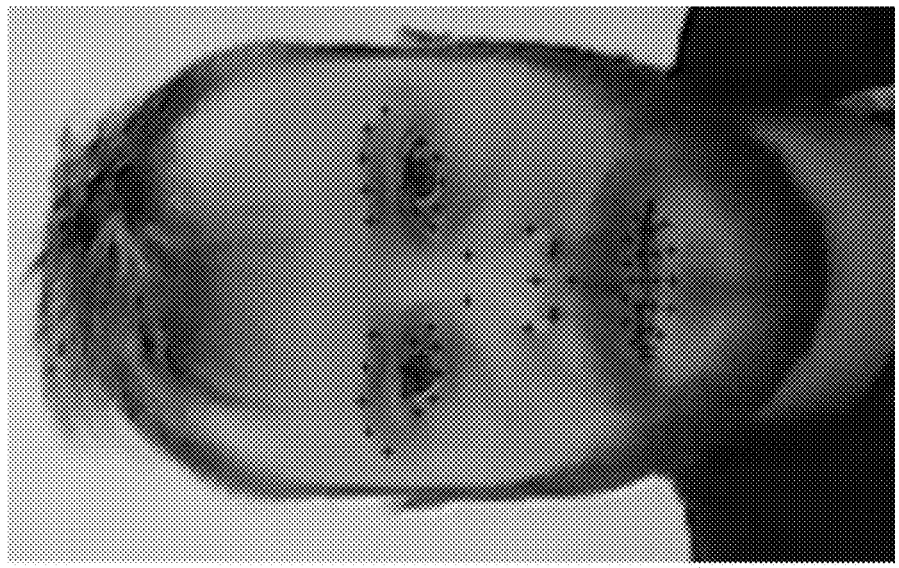
FIG. 11B shows the improved accuracy of the specific individual feature locator in the mouth region relative to the generic subject feature locator implementation of FIG. 11A, in accordance with an embodiment of the present invention.
Figure 11A:
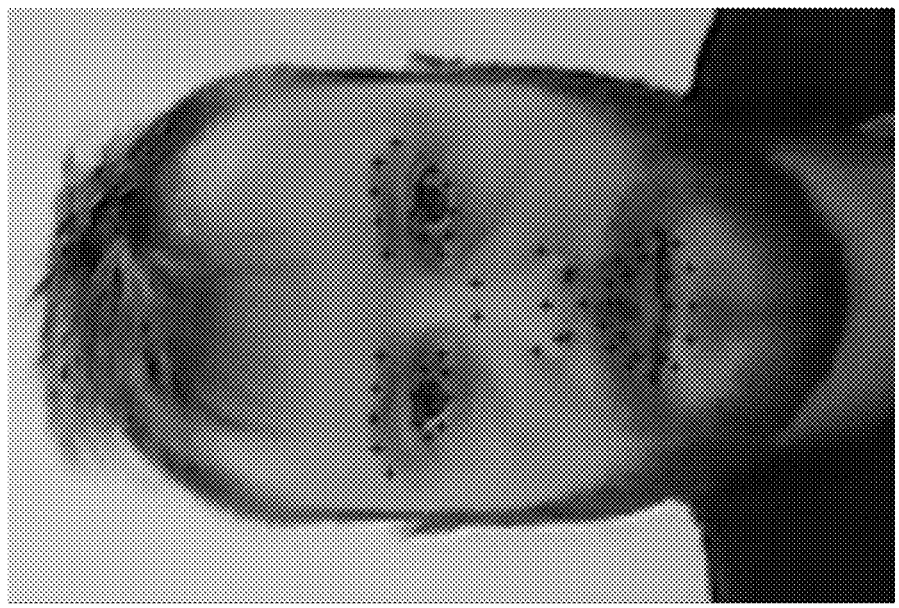

With reference, now, to FIG. 10, the locate features module 901 can be applied with any feature locator. In one embodiment of the invention, a generic subject tracker 301 is used in this module. The generic subject feature locator is trained using data containing both identity and expression variation and, as such, can locate features in a wide variety of individuals showing a range of expressions. However individual subjects with an appearance that is not well represented in the training data may result in inaccurate feature locations. One example of this is shown in FIG. 11A, where the features around the individual's mouth have been inaccurately placed. The system can improve on this result by tailoring a feature locator to a specific individual, after a calibration image of the specific subject has been obtained. In module 900, the calibration feature locator 300 is used extract reliable feature locations for any subject exhibiting a constrained expression. That information may then be used to construct a specific individual feature locator 302 tailored to that individual.

In accordance with preferred embodiments of the present invention, the calibration feature locator is trained on multiple identities with neutral facial expressions and the subject is required to adopt this expression for the period of the calibration process. The specificity of the calibration tracker to neutral expressions enables it to extract reliable feature locations at this expression for a far wider set of identities than the generic feature locator. An example of improvements gained using this approach is shown in FIG. 11B, as previously discussed, where the accuracy of the specific individual feature locator is improved in the mouth region.

A specific individual feature tracker is constructed in module 1000 (shown in FIG. 10) by incorporating the optical flow (as defined above) between the individual's neutral appearance and the current image sample into the formulation of the update model. As used herein and in any appended claims, the term "optical flow" refers to an estimation of motion based on assumptions of the temporal appearance consistency of features in a visual scene given small feature displacements. In the update model context, in accordance with embodiments of the present invention, if the features are close to the solution, the optical flow provides valuable information about the direction and magnitude of the update step. This information is extracted with reference to the specific appearance of the individual allowing the model to become more tailored to the individual.

Furthermore, the specific formulation of this combination is achieved in such a way as not to increase the computational complexity of the update model. This formulation is also novel in the prior-art and is extremely valuable in retaining the real-time performance of the specific individual feature locator. This process will now be described. The underlying formulation of the optical flow and its relationship to the update model of a feature locator will first be described, then the process of creating a specific individual feature location will be explained.

In the calibration phase, a vector of calibration samples $S_0$ is obtained using the calibration feature locator 300 and the location module 901. In accordance with preferred embodiments of the invention, the calibration sample represents the neutral appearance of a subject. From this vector, a calibration shape free image $I_0 = I_{sf}(S_0)$ can be reconstructed. At each iteration of the tracking process, a new vector of image samples $S_t$ is obtained and, from these multiple samples, a new shape free image $I_t = I_{sf}(S_t)$ may be reconstructed.

Making assumptions that are standard in the field of facial performance tracking, and following the algorithm of Horn & Schunck, the optical flow between the neutral appearance and the current image sample can be estimated by minimizing the following cost function with respect to u and v:

$$C_f(u,v) = \|I_x u + I_y v + I_0 - I_t\|^2 + \sum_{(i,j) \in G_S} \alpha(\|u_x\|^2 + \|u_y\|^2 + \|v_x\|^2 + \|v_y\|^2),$$

where $$I_x = I \otimes_s [1,0,-1]/2$$

$$I_y = I \otimes_s [1,0,-1]^T/2$$

$$u_x = u \otimes_s [1,-1]$$

$$u_y = u \otimes_s [1,-1]^T$$

$$v_x = v \otimes_s [1,-1]$$

$$v_y = v \otimes_s [1,-1]^T$$

Here, u and v represent two scalar images with u representing the warping magnitude (or optical flow) in the x direction and v representing the warping magnitude in the y direction, and $\alpha$ is a regularisation coefficient which may be manually tailored to the desired application.

By reformatting u and v into a single vector $f = [I_{sf}^{-1}(u)^T \; I_{sf}^{-1}(v)^T]^T$ that will be referred to, herein, as the "optical flow vector," the minimized function $C_f$ may now be rewritten in a matrix form:

$$C_f(f) = \|Gf + S_0 - S_t\|^2 + \alpha f^T L f$$

with $$G = [diag(I_{sf}^{-1}(I_x)) \; diag(I_{sf}^{-1}(I_y))]$$

and $$L = \mathrm{kron}(M_x^T M_x + M_x^T M_x, I_{2 \times 2}),$$

where kron denotes the Kronecker tensor product.

In this representation, G is a sparse matrix containing information about the gradient of the shape-free image in both x and y directions, and $f^T L f$ represents a smoothness measure of the optical flow estimate. Thus, a statement of the objective is to find the optical flow vector that most accurately represents the image warp field between $I_0$ and $I_t$, while retaining as much smoothness as possible. The minimiser f of the function $C_f$ may be found by solving the linear system:

$$(G^T G + L)f = G^T(S_t - S_0)$$

using a specialized solver for sparse positive definite systems, such as described, for example, by Zlatev, "*Computational Methods for general sparse matrices*," Kluwer, (1991), which is incorporated herein by reference, or otherwise.

In one embodiment of the invention, the foregoing formulation of optical flow is integrated into a trained update model framework by adding the coefficients of u and v to our sample vector to produce an augmented sample vector S'. A new augmented update matrix B' is formed by adding a third sub-matrix $B_3$ to the update model coefficients B such that $B' = [B_0^T, B_1^T, B_2^T, B_3^T]^T$. The sub-matrix $B_3$ represents the contribution of the optical flow to the update of the model during tracking and its coefficients must be determined during the training phase. To achieve this, a calibration image is associated with each image in a training set. In the preferred embodiment this calibration image contains the same individual as in the training image but with a neutral expression. The corresponding optical flow denoted $f_i$ for each training example is computed, and an augmented training data matrix $D' = [D_1', \ldots, D_E']$ is constructed, with $D_i' = [D_i'^T \; f_i^T]^T$. The augmented update matrix B' can then be derived using the same regression technique as the one used in the Training Feature Locator section above.

The update function with optical flow is now as follows:

$$U_0(X,S) = X + [B_0 + B_1 S + B_2[X - \overline{X}]_{2N \times 1} + B_3 f]_{2 \times N},$$

with f the solution of $$(G^T G + S)f = G^T(S - S_0).$$

The foregoing equation, and therefore the solution of the system, must be calculated at each iteration of tracking for all hypotheses and on every frame of video. The computational complexity of this operation is therefore critical to the performance of a tracking system in accordance with the present invention. A novel formulation of optical flow may be used, in accordance with preferred embodiments of the invention, to implement this operation with no additional computational cost over our standard non-augmented tracker. This is extremely valuable in achieving a real-time performance for calibrated specific individual feature locators. In particular, instead of solving this system at every iteration, f can be rewritten as follows:

$$f = H(S - S_0)$$

where $H = (G^T G + L)^{-1} G^T$. In this equation, H does not depend on the current image sample S, but it is determined by the sample obtained from the specific individual during calibration and therefore contains the information about the individual's appearance. However, the matrix H is large with dimension $2N_s \times N_s$ and the above multiplication is too computationally and memory intensive to be performed at each iteration. However, the update equation can be rewritten in a more computationally efficient form as follows:

$$U_0(X,S) = X + [B_0' + B_1'S + B_2[X - \overline{X}]_{2N \times 1}]_{2 \times N} = X + [B_0 + B_1S + B_2[X - \overline{X}]_{2N \times 1} + B_3f] \quad \text{(Eqn. 2')}$$

with $$B_0' = (B_0 - HS_0)$$

$$B_1' = (B_1 + B_3H). \quad \text{(Eqn. 3)}$$

The new update matrices are referred to herein, and in any appended claims, as "baked matrices," as they can be thought of as "baking" the calculation of the specific individual's optical flow into the pre-existing update model coefficient matrices. This results in an update model that is specific to the calibration sample of a specific subject.

Module 1000 (shown in FIG. 10) creates a specific individual feature locator 302 using information contained within the generic subject feature locator 301 together with information about the individual's neutral appearance. A generic subject feature locator contains the matrix $B_3$ that was learnt as part of the training process. As described above, this matrix represents information about how optical flow is mapped to feature location updates as described in Eqn. 2. During the calibration process a robust estimate of the specific individual's neutral appearance is extracted from module 901. This provides the calibration sample vector $S_0$. Module 900 uses Eqn. 3 to bake the identity specific optical flow information into the update model matrices $B_0'$ and $B_1'$, resulting in a update model that is tailored to the specific appearance of the individual as recorded in sample vector $S_0$. This process results in a specific individual feature locator 302 that is significantly more effective at locating features on the individual it is calibrated on than the un-calibrated generic feature locator. An example of this improvement is shown in FIG. 11B, where the accuracy of the specific individual feature locator is improved in the mouth region. Furthermore, this improvement in accuracy is achieved without introducing extra computational cost when analysing frames after the calibration process.

Measuring Expression

Figure 12:
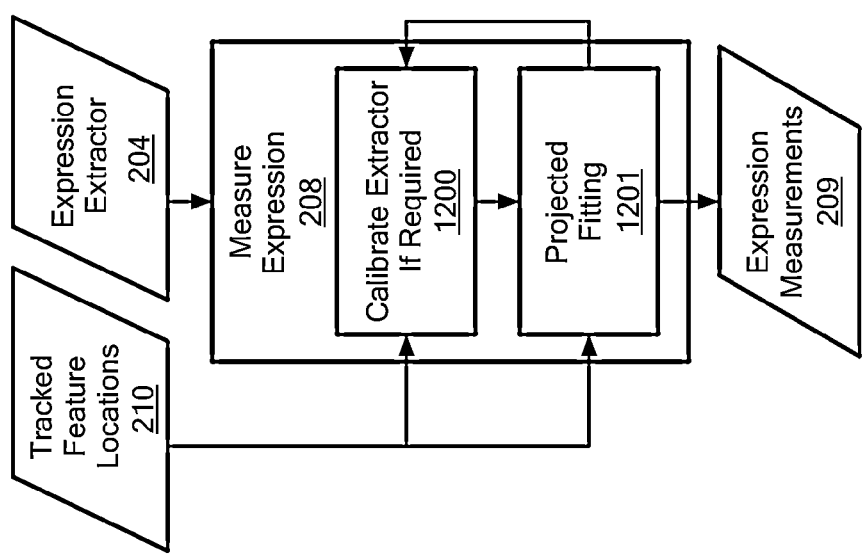
FIG. 12 shows a flowchart of an expression parameter measurement process, in accordance with embodiments of the present invention.

Measuring expression from tracked feature locations is performed in module 208 and is shown in detail in FIG. 12. The method employs an Expression Extractor 204 and has two processes, Calibrate Extractor If Required 1200 and Projected Fitting 1201. The calibration module ensures that expression measurements are not contaminated by varying subject identity and can therefore be used as a measure of absolute facial expression across subjects.

Expression extractor 204 is used to measure the current expression of the subject. FIG. 4 shows the structure of the extractor, which consists of two Expression Measurer objects; a Generic Subject Expression Measurer 400 and a Specific Individual Expression Measurer 401. Each measurer consists of a 3D model of facial shape and allowable shape variation, together with a set of fitting regularisation parameters. The extractor is represented as the variables:

$$\text{Measurer} = \{E_0, \xi_1, \ldots, \xi_n, \lambda_1^T, \ldots, \lambda_1^T \lambda_1^s, \ldots, \lambda_1^s\}.$$

$E_0$ is a base-shape defined as a set of control points in 3D space, $\xi_1, \ldots, \xi_n$ is a set of n basic facial shape variation matrices, $\lambda_1^t, \ldots, \lambda_n^t$ is a set of temporal regularisation parameters and $\lambda_1^s, \ldots, \lambda_n^s$ in is a set of shape variation regularisation parameters which are used during projected fitting.

In accordance with preferred embodiments of the present invention, the base-shape represents an average facial shape with a neutral expression and the control points represent the same physical locations as the feature locations produced by the tracker. The position of these model control points can be manipulated to represent varying 3D facial shape of the subject. To allow this shape manipulation, a set of basic facial shape variation matrices $\xi_i$ is used. The facial expression matrices represent the difference between the neutral facial shape and a particular target facial expression shape. They can be combined linearly with the base shape to produce a 3D representation of a face with a particular shape $$y_m = F_0 + \Sigma_i x_i \xi_i, \quad \text{(Eqn. 4)}$$

where $x_i$ represents how much of each facial shape is present in the final model shape.

Figure 14A:
FIGS. 14A-14C show examples of a measured facial expression, with crosses indicating tracked feature locations, and the animated characters displaying the expression constructed from the measured facial expression vector, in accordance with embodiments of the present invention.
Figure 14B:
Figure 14C:
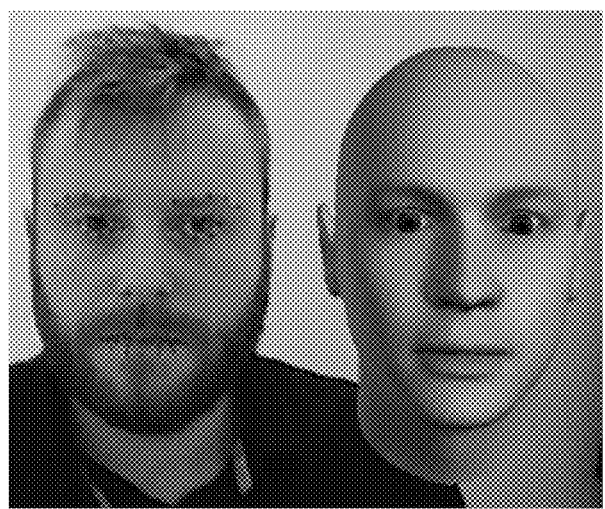

Matrices $\xi_i$ may be constructed by hand or learned from data, and may be tailored to the particular application of the system. In preferred embodiments, some of the matrices represent basic facial expressions and some represent facial shape variation associated with differences between subjects. In this way, by determining values for each $x_i$ we measure the expression and identity parameters of the subject. The values of x can be visualised using a computer animated character with controls that correspond to the expressions of each $\xi_i$ matrix. The control points of the measurer object correspond to a subset of the vertices of the character. Each character control recreates the displacements of an $\xi_i$ matrix at these vertices along with displacements for all other vertices that correspond to the underlying physical facial expression. The controls combine in the same way as in Eqn. 4 to form a complete character expression. Construction of a character of this type, within the scope of the present invention, may employ any of the techniques known in the art or subsequently developed. FIGS. 14A-14C show examples of a measured facial expression, the black crosses show the tracked feature locations, the animated character displays the expression constructed from the measured vector x. FIG. 14A employs uncalibrated specific individual expression measurement, FIG. 14B employs generic subject expression and ID measurement, and FIG. 14C employs calibrated specific individual expression measurement, all in accordance with embodiments of the present invention.

Projected Fitting

An objective of certain embodiments of the present invention is to determine the position, orientation and expression of the 3D measurer model given the feature locations y and the previous model parameters $x^{t-1}$ if available. To do this, a projected fitting method is employed to position, orient and set the expression of the measurer to minimise the distance between the projected measurer control points and the feature locations in the image frame. In preferred embodiments, this process is achieved by solving the following equations:

$$x_o|\hat{x} = \operatorname{argmin}_x \Sigma\Sigma(f(x)-y)^2 + \Sigma_i \lambda_i^s x_i^2 + \Sigma_i \lambda_i^t (x_i - x_i^{t-1})^2, \quad \text{(Eqn. 5)}$$

subject to $\alpha_i \leq x_i \leq \beta_i$, where f(x) is a non-linear function mapping the vector of parameters to a matrix of 2D feature locations, $\lambda^s$ is a vector of regularisation coefficients and $\lambda^t$ is a vector of temporal regularisation coefficients for each parameter, $x^{t-1}$ is the vector of parameters from the previous frame of fitting and $\alpha_i, \beta_i$ are upper and lower bounds for each parameter. The vector of parameters is partitioned into two vector components, $x = [x^t,$ $x^e$], where $x^t$ represents the parameters of a transform function, $x^e$ represents the expression and ID parameters, and $f(x)$ represents the projection:

$$f(x) = f_{proj}(x^t, E_0 + \Sigma_i x_i^e \xi_i). \quad \text{(Eqn. 6)}$$

In a preferred embodiment, $f_{proj}$ is a non-linear 3D to 2D projective transform the form of which is well known in the art to which this invention pertains, for example as taught in Carlbom, et al., "*Planar Geometric Projections and Viewing Transformations,*" *ACM Computing Surveys* 10 (4): 465-502, (1978), doi:10.1145/356744.356750, incorporated herein by reference. The intrinsic parameters of this transform are assumed to be fixed and known a-priori and, as such, $x^t$ contains only the six extrinsic translation and rotation parameters required to define the transform. The intrinsic parameters can be determined and fixed either by direct estimation or from camera characteristics, using any of the well-known methods in the prior art, a review of which is provided by T. A. Clarke and J. G. Fryer, "*The Development of Camera Calibration Methods and Models,*" *Photogrammetric Record*, 16(91): 51-66, (1998), which is incorporated herein by reference. In the preferred embodiment, basic assumptions are made as to the likely intrinsic parameters of a consumer web-camera or mobile device camera. Due to the relatively planar aspect of the tracked facial features in proportion to the distance of the face from the camera, intrinsic projective parameters are not critical to the final fit and our fixed assumptions have been found to be sufficient to produce accurate expression estimates. The function in Eqn. 6 describes the fitting of a 3D model to a set of 2D data. This solution is inherently under determined and the model may have more degrees of freedom than there are constraints available in the input data. For these reasons, the temporal and parameter regularisation components are essential to achieve a stable system of measurement. The system of equations of the type defined in Eqn. 5 can be solved by standard constrained non-linear optimisation techniques, for example, as taught by Nocedal et al., "*Numerical Optimization*", (Springer-Verlag, 1999). In a preferred embodiment, a Gauss-Newton approach is used, with constraints imposed using Quadratic Programming, for example, as taught by Nocedal et al., "*Numerical Optimization, Chapter 18 Sequential Quadratic Programming*" Springer-Verlag, 1999. FIGS. 14A-14C show examples of fitted measurer models, the black crosses show the tracked feature locations y, the light grey crosses show the resulting fitted projected points $f(x_{opt})$, and the animated character displays the expression constructed from the measured vector $x_{opt}$.

To obtain an accurate measurement of the expression of a subject, the foregoing measure is normalized with respect to the individual's identity. This is achieved by module 1200, now discussed with reference to FIGS. 12 and 13. The process can be triggered either automatically, for example on the first frame of analysis, or by user request. During this process, it is desirable that the subject face the camera and adopt a neutral facial expression.

It is assumed that the individual's identity is determined by their 3D facial shape at a neutral facial expression. The calibration process shown in FIG. 13 determines this shape using Generic Subject Expression Measurer 400 in module 1201 and uses the outcome to produce Specific Individual Expression Measurer 401 in module 1300. In a preferred embodiment, the parameter regression parameters in the Generic Measurer 400 are tailored to allow identity shape variation parameters to be modified with less regularisation than expression, and setting the temporal parameters to $\lambda_i^t = 0$ removes the influence of the previous frame of the measurement process. This takes into account the identity variation of the subject and allows for small expression variation from neutral in the subject's appearance to be taken into account which is beneficial in a real-world application. It also allows new subjects to calibrate the extractor without being influenced by results from previous subjects.

Figure 13:
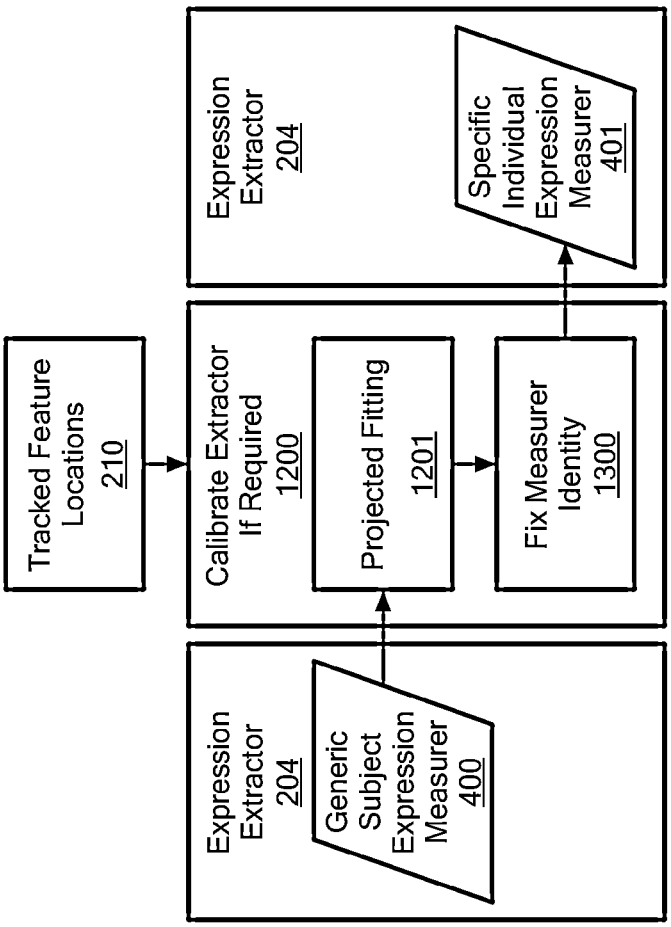
FIG. 13 shows a flowchart of an expression extractor calibration process, in accordance with embodiments of the present invention.

With further reference to FIG. 13, module 1300 uses the results of projected fitting of the generic measurer to fix the identity of the specific measurer. Using Eqn. 4 and the results of the generic measure fitting $x_{opt,generic}$, the 3D shape of the subject's neutral expression can be determined as $y_{m,generic}$. The specific individual measure is modified to have a base-shape equal to this neutral face shape: $E_{0,specific} y_{m,generic}$. The Specific Individual measurer 401 shape variation matrices $\xi_i$ can be predetermined and fixed or can also be adjusted by a suitable transform to take into account the individual's neutral face shape. In a preferred embodiment, the matrices are fixed a-priori and do not contain any identity-based shape variation. As such, only expression measurements are returned from the specific individual measurer. The temporal regularization parameters of the specific individual measurer $\lambda^t$ are chosen to produce smoothly varying expression measurements and the shape variation regularization parameters $\lambda^s$ are chosen to give less regularization to common facial expressions.

The separation of the measurement of an individual's identity and expression during this calibration process ensures that expression measurements produced by module 208 are not contaminated by varying subject identity. These measurements can therefore be used as a reliable measure of absolute facial expression across subjects. FIG. 14A shows measured expression from an un-calibrated specific individual measurer, FIG. 14B shows the fitted generic measurer and FIG. 14C shows the expression from the resulting calibrated specific measurer. Note how the measured expression in FIG. 14A is not neutral and does not match that of the subject, however after calibration in FIG. 14C the measured expression is more neutral and matches the subject more accurately.

Devices

Figure 18:
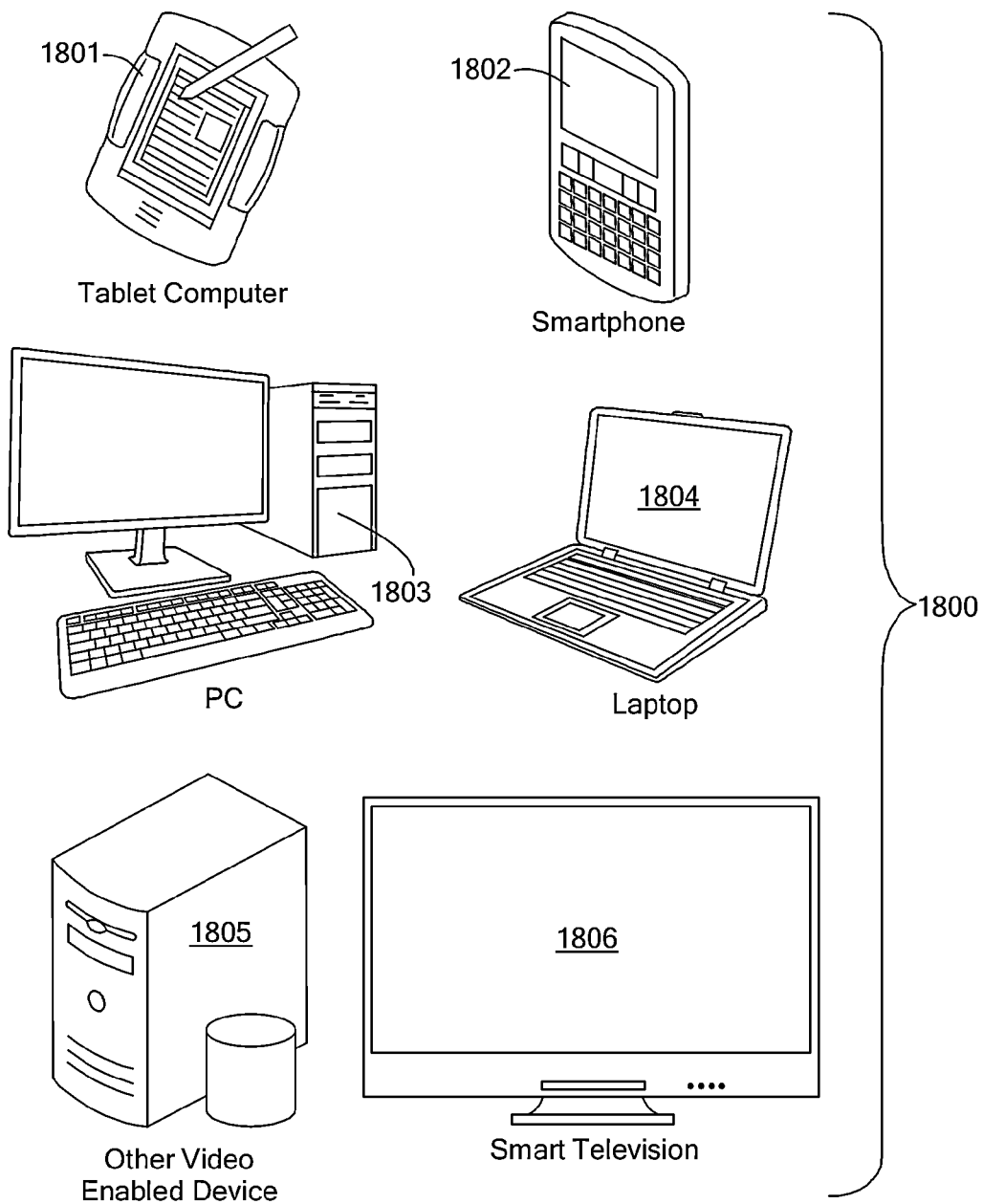
FIG. 18 shows a variety of devices, depicted by way of non-limiting example, that can be used to capture video, perform tracking and expression measurement, render and display resulting video or image content.

Embodiments of the present invention may be used, performed, or instantiated, as the case may be, on a variety of devices. Some of these devices, designated generically by numeral 1800, are depicted in FIG. 18, without limitation, and by way of example. As shown in the figure, examples of such a device are, but are not limited to, personal computers 1803, laptops 1804, tablet computers 1801, smart phones 1802, smart TVs 1806 and any camera-equipped device 1805 with suitable processing hardware. Typically the processor in a basic modern smart phone is all that is required to extract facial location and expression measurement data at over 30 frames per second.

Figure 19:
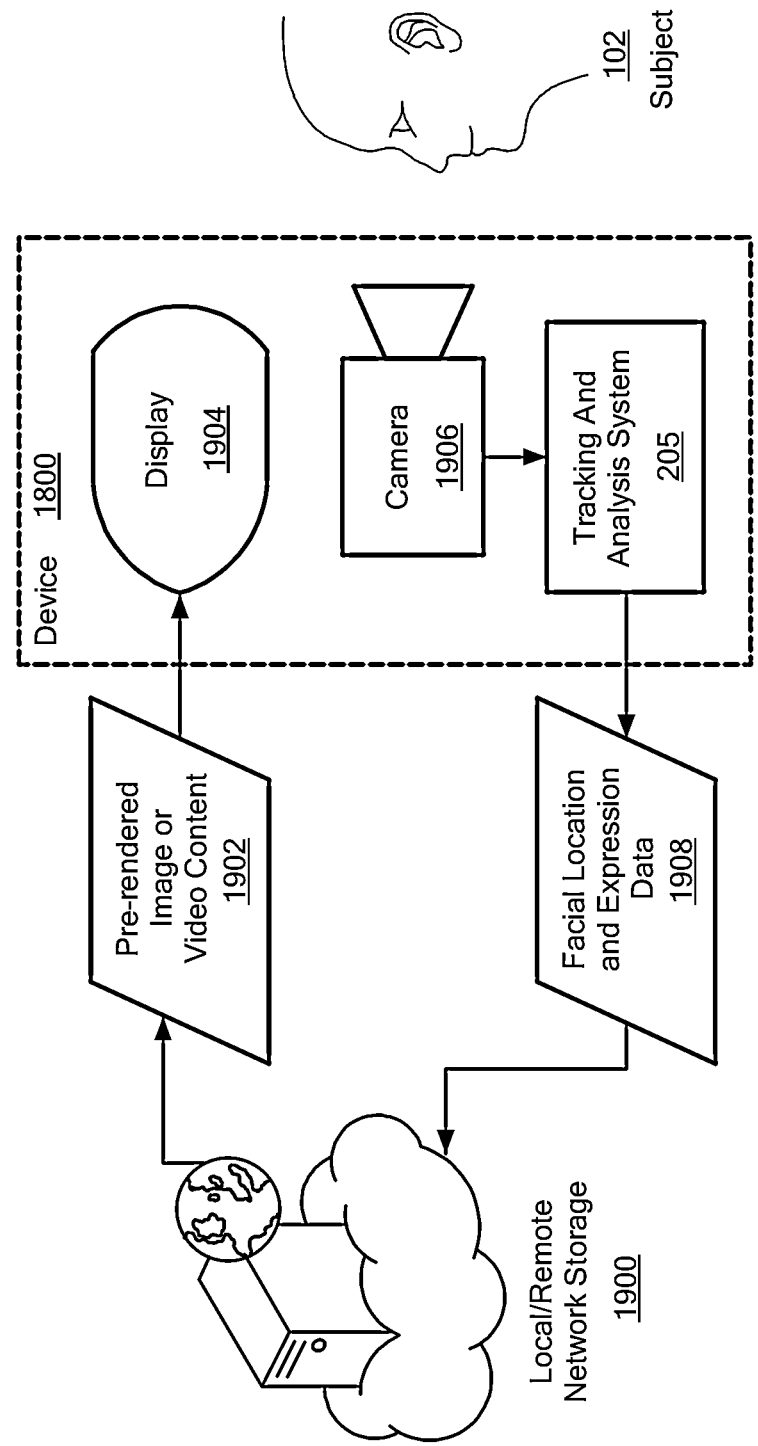
FIG. 19 shows a system where facial location and expression measurements pertaining to pre-rendered image or video content can be calculated and stored for later retrieval and analysis

Expression Analysis for Measuring Reaction to Pre-Rendered and Dynamically Generated Display Content Measuring the emotional reaction of subject 102 to a piece of pre-rendered or dynamically rendered display content 1902 is now described with reference to FIG. 19. Such measurement provides an extremely valuable source of information. For example, facial location and expression data 1908 can be used to measure the effectiveness of advertising or other video presentation, where effectiveness is measured on the basis of a specified criterion. A further application includes measurement of the reaction of trial users to features during software design. One embodiment of the present invention allows the extraction of expression measurements 1908 from pre-rendered content 1902 and their storage in a way that will allow subsequent recall and analysis. In accordance with the embodiment depicted in FIG. 19, pre-rendered content 1902 is delivered to a display 1904 of device 1800 from local or remote storage 1900. Subject 102 views the display 1904 and a video of the subject's facial reactions is captured by camera 1906. The video is analysed by the tracking and expression measurement system 205 described above, and the facial location and expression data 1908 that is produced is logged in a local or network storage device 1900 in such a way that it can be associated with the instant of the pre-rendered content 1902 that was being displayed at the reaction time. The communication and data storage required by this system will be obvious to one skilled in the art.

Particular embodiments of the present invention, provided solely by way of example and without limitation, include instances in which pre-rendered content 1902 is in the form of a video or an image advertisement and expression information 1908 is used to assess the emotional reaction of subject 102 to the advertisement. Another exemplary application of an embodiment as described with reference to FIG. 19 may entail the form of a particular television program, where the expression and tracking information 1908 may be used to assess the presence or absence of individuals and their level of attention to the broadcast, such as to derive measures for purposes of TV analytics.

Figure 20:
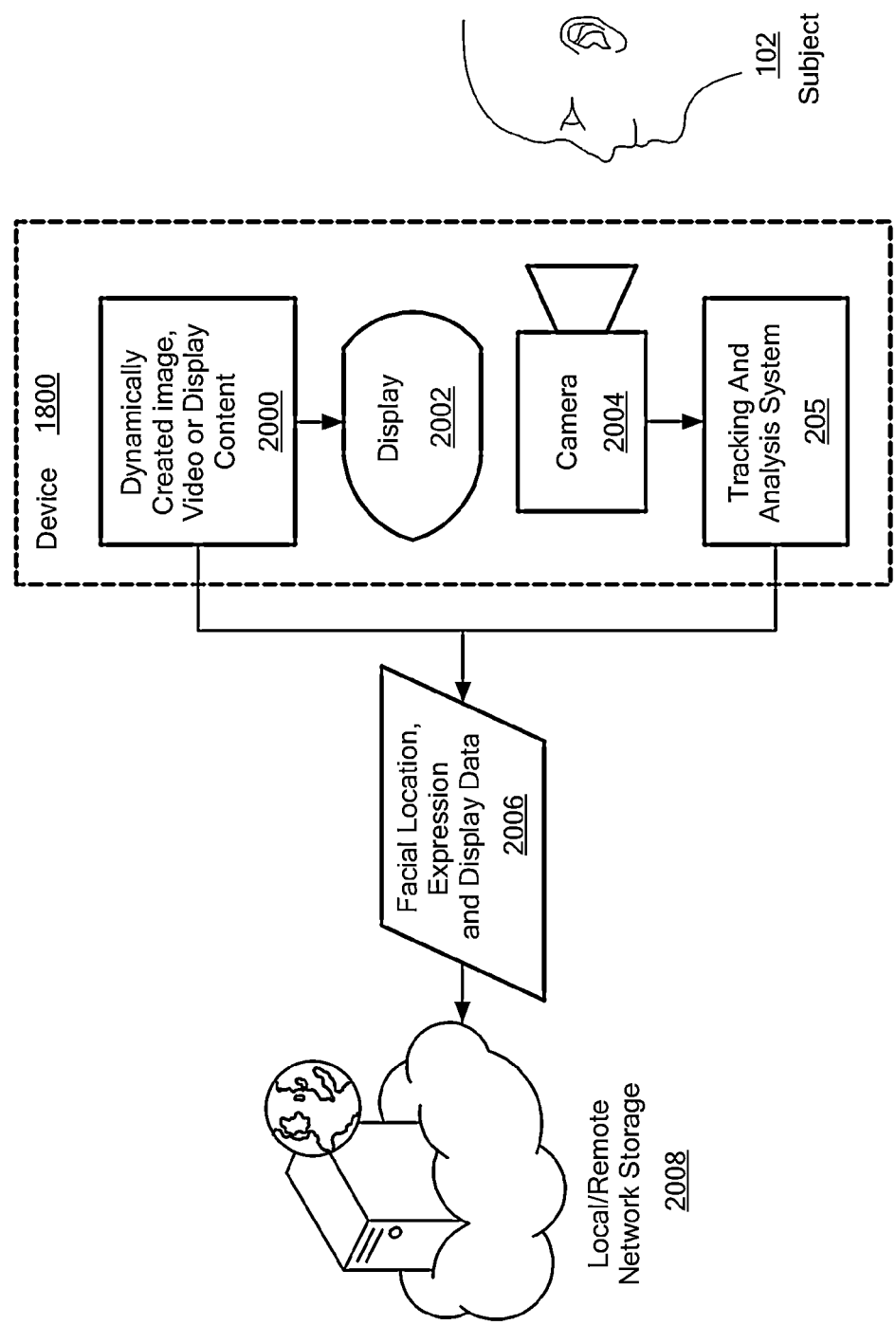
FIG. 20 shows a system where facial location and expression measurements pertaining to dynamically generated display content can be calculated and stored for later retrieval and analysis

Expression measurements extracted from dynamically generated content may also be stored in a way that provides for subsequent recall and analysis, as now described with reference to FIG. 20. In accordance with such embodiments of the present invention, dynamically generated display content 2000 is delivered to a display 2002. Subject 102 views the display, and a video of their facial reactions is captured by a camera 2004. The video is analysed by the tracking and expression measurement system 205, as described above, and the facial location and expression data 2006 that is produced is logged in a local or network storage device 2008 in such a way that it can be associated with the characteristics of the dynamically rendered content that was being displayed at the reaction time. The communication and data storage required by this system will be obvious to one skilled in the art. In one embodiment of the above system, the dynamically rendered content may be in the form of a software application running on the device 1800, and the facial tracking and expression measurements allow the analysis of emotional reaction to the software and areas of the display where attention is most closely focused.

Avatar Animation

Figure 15:
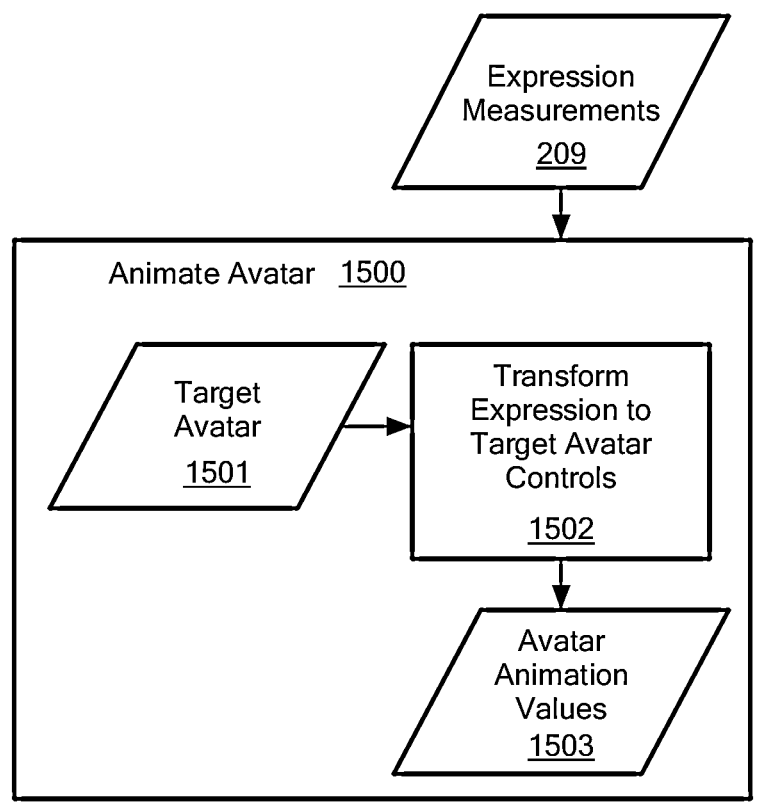
FIG. 15 shows a flowchart of an avatar animation module which maps expression measurements onto avatar controls in accordance with embodiments of the present invention.
Figure 16A:
FIG. 16A-16D show examples of the output of processes described with reference to FIG. 15.
Figure 16B:
Figure 16C:
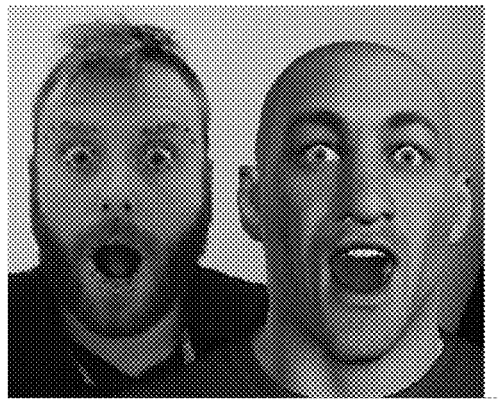
Figure 16D:

In accordance with other embodiments of the present invention, facial expression measurements, extracted as described above, may be employed to produce real-time avatar animation from an individual's facial performance in an unconstrained consumer environment, as shown as module 1500 in FIG. 15. The expression measurement process produces identity-independent parameters which can be mapped onto an avatar to faithfully reproduce an individual subject's performance. If the identity of the subject were to be left to contaminate the expression measurements, the final avatar animation could be distorted in an undesirable way.

The creation of avatar animation contains several submodules. As the expression measurements are an abstract representation of the configuration of a subject's facial expression, the target avatar is not constrained to have a physical correspondence or similarity with the subjects face shape. First, target avatar 1501 implements a set of controls allowing its shape to vary. These controls need not be the same number or meaning as the expression measurements. The expression measurements are transformed onto the avatar control set in module 1502. This transform can be implemented by any appropriate mapping function. In our preferred embodiment this is a linear matrix which maps, combines and scales expression measurements onto avatar control values. This matrix can be hand crafted to implement desired stylistic animation characteristics such as exaggerated expressions for cartoon characters. If a simple linear relationship is not sufficiently expressive to meet this requirement, any other transform method may be used, as described, for example, in U.S. Pat. No. 8,026,917. The output of module 1502 is a set of avatar animation values 1503, which are used to set the shape of the final avatar. Examples of the output of this process are shown in FIGS. 16A-16D. Here, the same individual's expression is mapped onto avatars with widely varying facial structure and 3D geometry. Applying the animation process to each frame of a performance in real-time results in an avatar animation that synchronises with, and faithfully reproduces, the facial expression of the subject.

Figure 21:
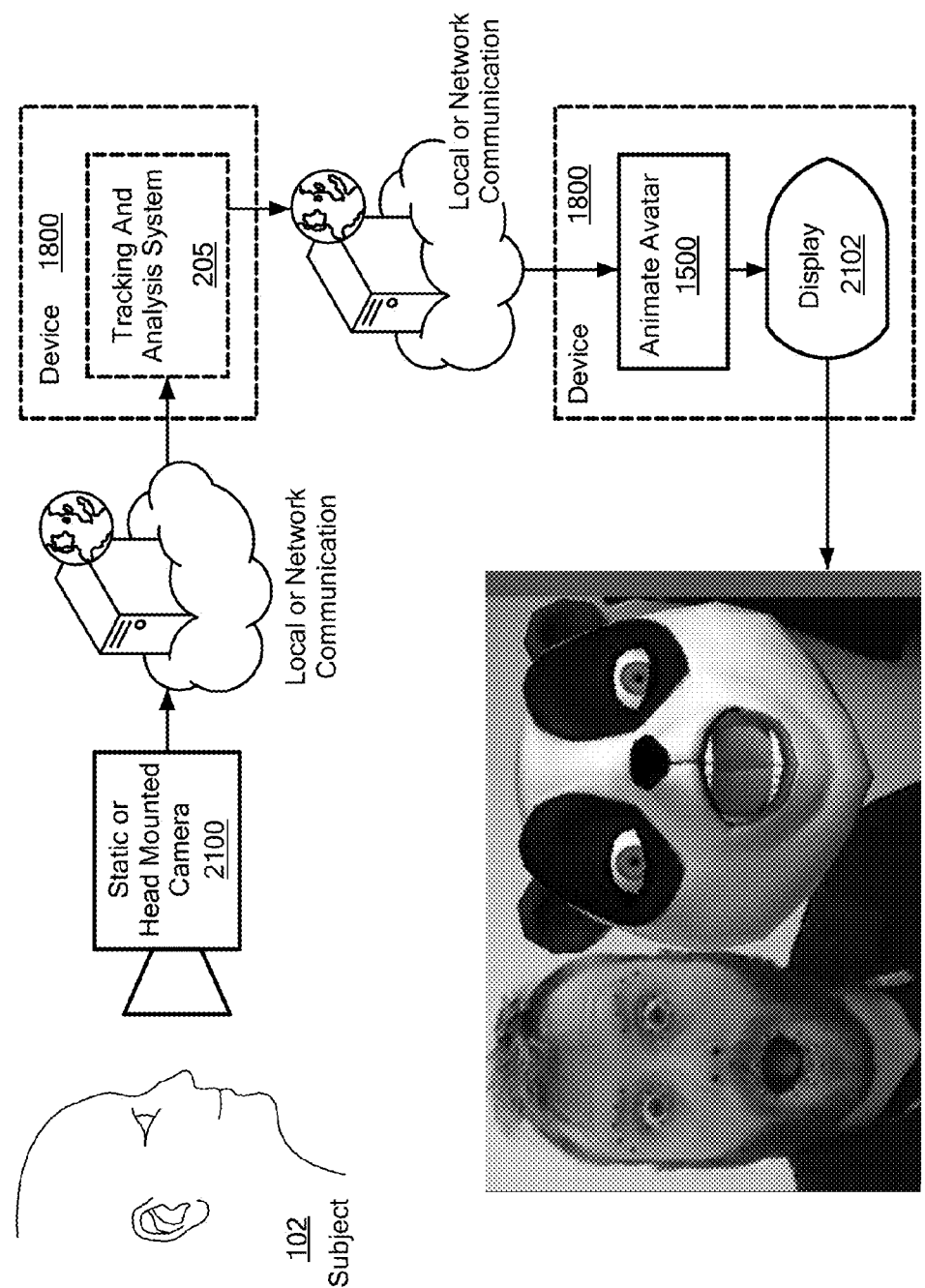
FIG. 21 shows a system where on-stage pre-visualization of performance driven character animation can be created and displayed

In a performance capture scenario, the ability to visualize an actor's performance on an animated character in real-time is a valuable source of information to assist the director's understanding of the likely appearance of the final animation. A further embodiment of the current invention can be used to create avatar animation for use as a performance driven animation pre-visualization system. FIG. 21 illustrates this embodiment where a subject's 102 performance is captured and the video sent by local or network communication to a device 1800 where it is analysed by the tracking and analysis system 205. The resulting expression measurements are sent to a display device which calculates avatar animation values using module 1500 and displays the resulting animation. In another embodiment of the above system the tracking, analysis, animation rendering and display are performed on the same device.

Animation Messaging and Chat

Figure 22:
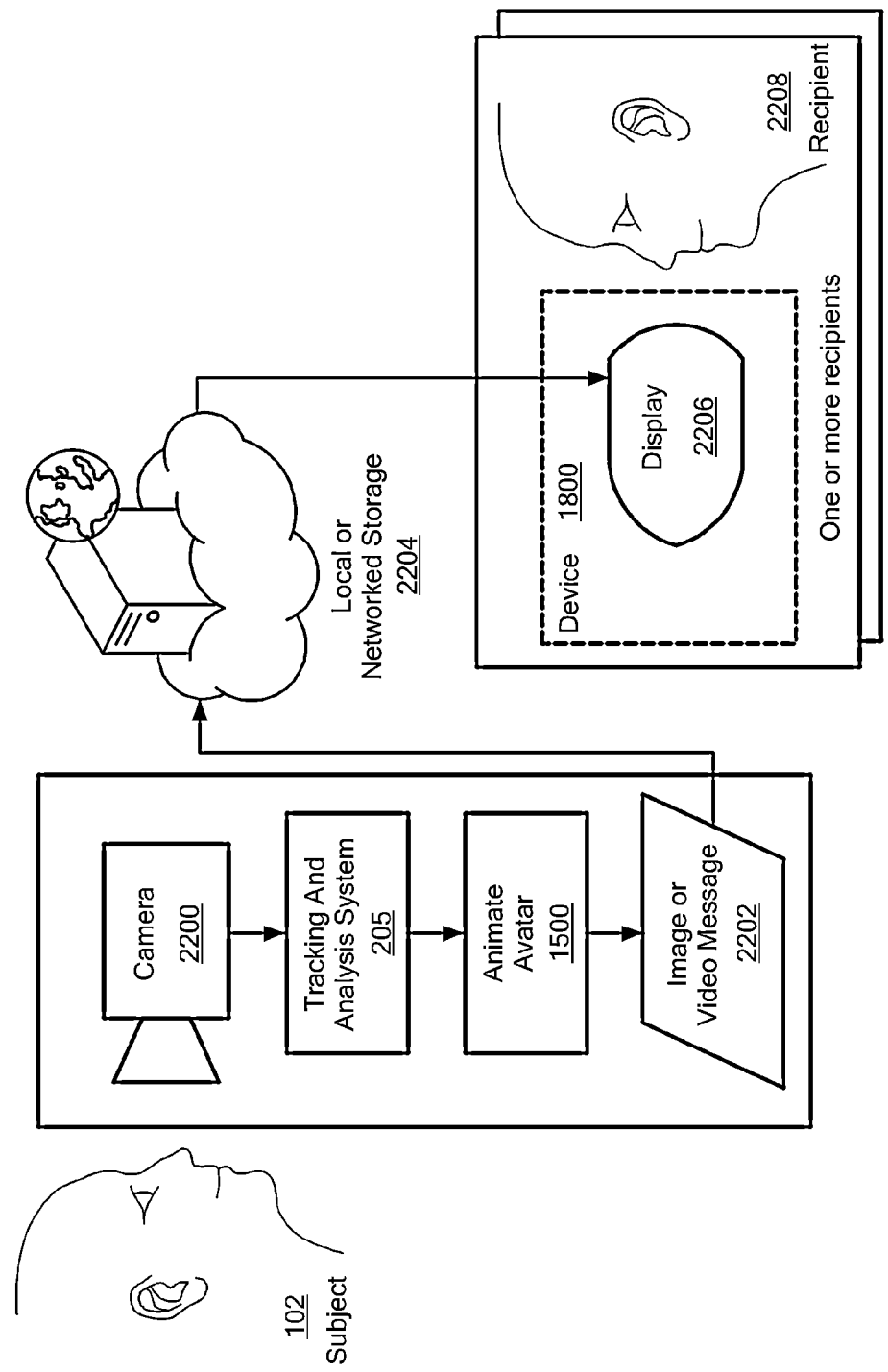
FIG. 22 shows a system where image or video messages of character animation can be generated in real-time and viewed at a later time by one or more recipients

As the prevalence of communication equipment with cameras has grown, the use of images and video of faces for communication has become commonplace. These visual communications may be one-to-one (images/video messaging and video chat) or one-to-many (video conferencing, publication of images or videos on sharing or social network sites). Situations exist where the users may wish to replace their own facial image with that of an animated avatar while retaining the benefit of visual face-to-face communication; to maintain their anonymity or entertain the recipient. FIG. 22 shows an animation messaging system which replaces the video of the sender with a rendered animation of an avatar performing the same facial expressions and movement to coincide with the audio. A device 1800 uses a tracking and analysis system 205 to track the features of the subject 102 in a captured video and generates an image or video of an avatar 2202. The video message containing the animated avatar is stored on the sender's device or on the local or networked storage. This message is then retrieved by one or more recipient devices for display.

Figure 23:
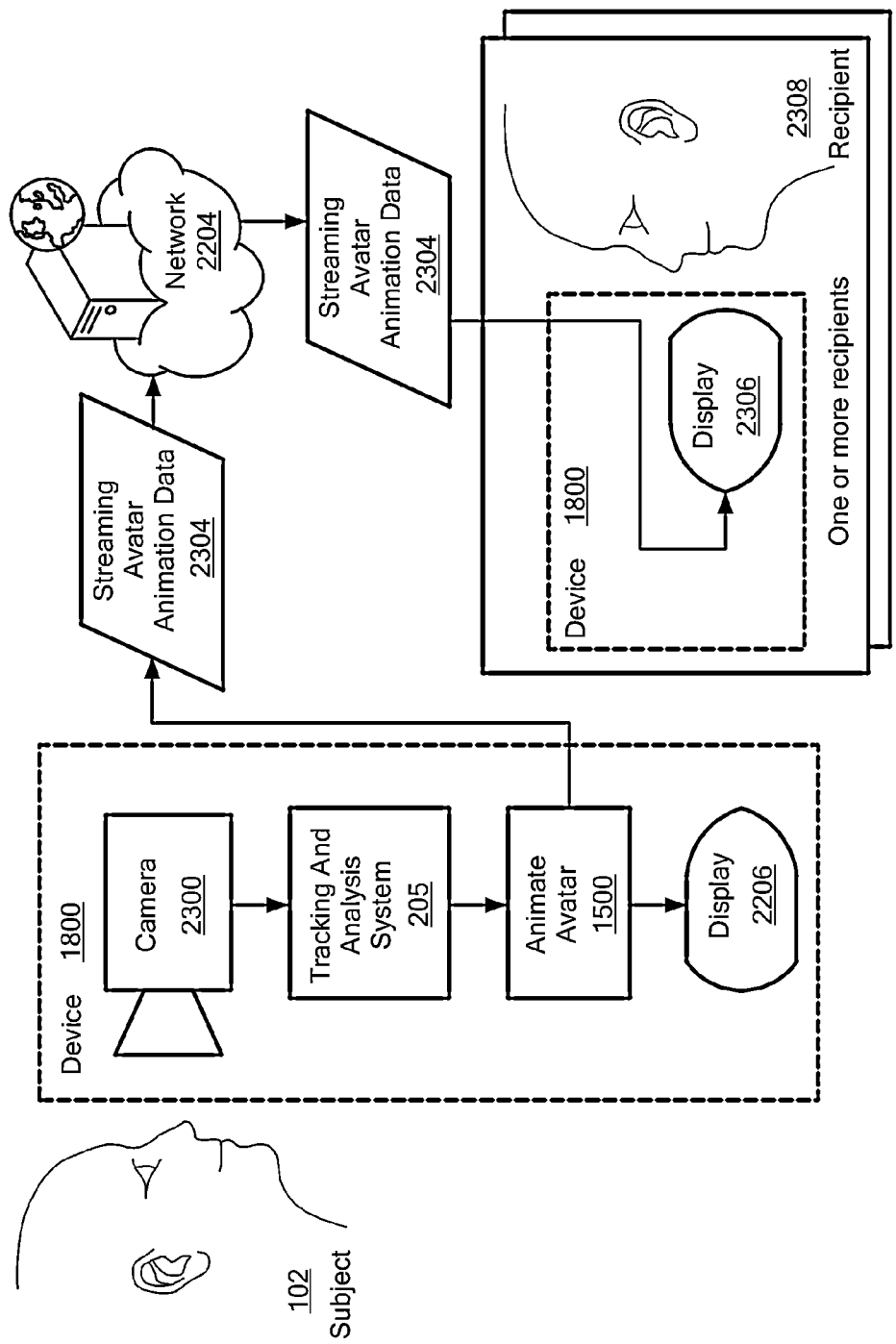
FIG. 23 shows a system where image or video content of character animation can be generated in real-time and can be viewed in real-time by one or more recipients in a "chat" scenario.

Another embodiment of the invention, illustrated in FIG. 23, shows a real-time video chat system where video content of the subject 102 is replaced by video content of an animated avatar. The subject's device captures the video and performs the tracking, analysis and avatar animation in real-time. The avatar animation data 2304 is streamed in real-time over a network 2204 to one or many recipient devices for display. The recipient devices may also include tracking and avatar animation modules to allow multi user avatar chat communication. Still further embodiments involve similar systems as above but where the tracking and animation components take place on the recipient's device.

Figure 17:
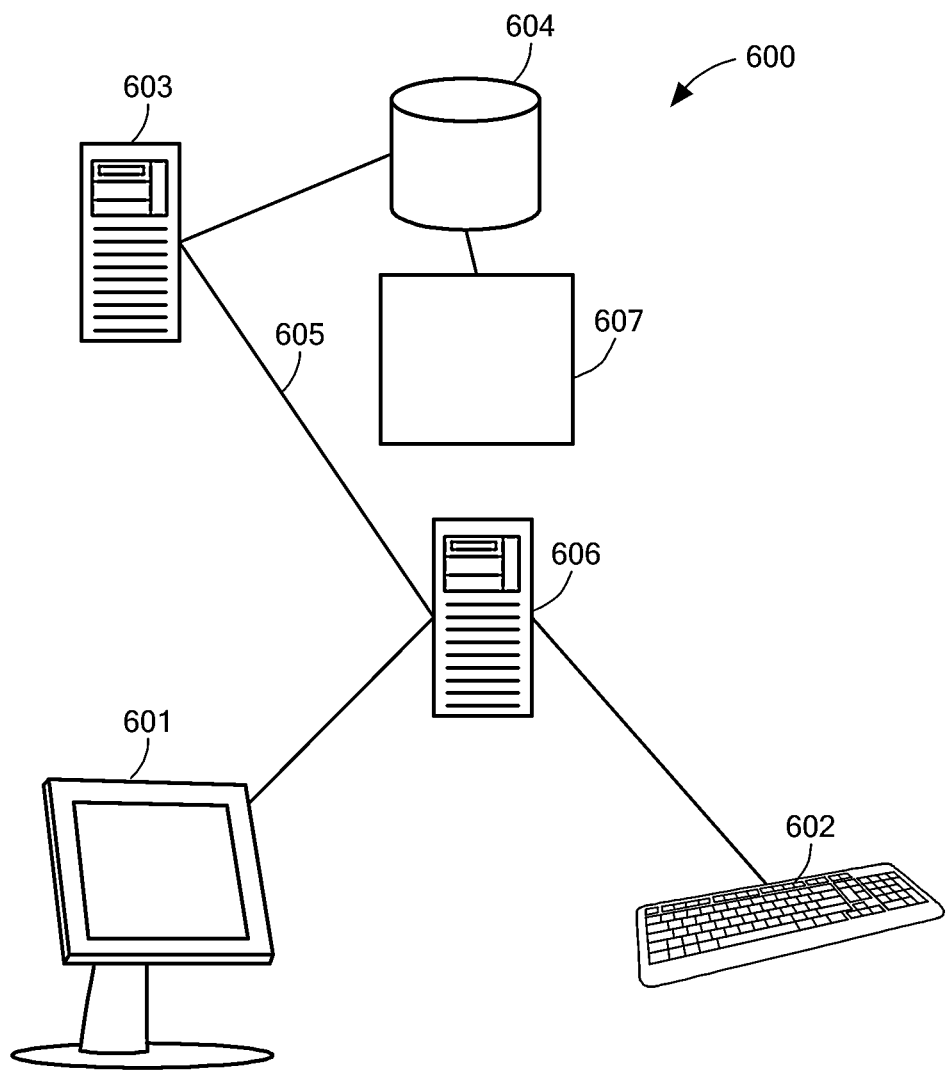
FIG. 17 schematically depicts one embodiment of a computer system that may be used to implement aspects of the present invention.

Various aspects of the invention may also be implemented as specialized software executing in a general-purpose computer system 600 such as that shown in FIG. 17. Alternatively, aspects of the present invention are advantageously implemented on mobile phones, tablets, and other devices. The computer system 600 may include a database server 603 connected to one or more memory devices 604, such as a disk drive, memory, or other device for storing data. Database server 603 stores an investor portfolio comprising a plurality of assets, or other data to which the present invention may be applied A processor 607 (also referred to herein as a central processing unit, or a processing server) 605 contains computer-executable software configured to perform functions taught in the foregoing description. Memory 604 is typically used for storing programs and data during operation of the computer system 600. Components of computer system 600 may be coupled by an interconnection mechanism 605, which may include one or more busses (e.g., between components that are integrated within a same machine) and/or a network (e.g., between components that reside on separate discrete machines). The interconnection mechanism 605 enables communications (e.g., data, instructions) to be exchanged between system components of system 600. Computer system 600 also includes one or more input devices 602, for example, a keyboard, mouse, trackball, microphone, touch screen, and one or more output devices 601, for example, a printing device, display screen, speaker. In addition, computer system 600 may contain one or more interfaces (not shown) that connect computer system 600 to a communication network (in addition or as an alternative to the interconnection mechanism).

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Although computer system 600 is shown by way of example as one type of computer system upon which various aspects of the invention may be practiced, it should be appreciated that aspects of the invention are not limited to being implemented on the computer system as shown in FIG. 17. Various aspects of the invention may be practiced on one or more computers having a different architecture or components than that shown in FIG. 17.

Processors 607 and operating systems employed in conjunction with servers 603 and 605 define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems (not shown) coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server system that includes components distributed among one or more server systems that perform various functions according to various embodiments of the invention. These components may be executable, intermediate, or interpreted code which communicate over a communication network (e.g., the Internet) using a communication protocol (e.g., TCP/IP).

It should be appreciated that the invention is not limited to executing on any particular system or group of systems. Also, it should be appreciated that the invention is not limited to any particular distributed architecture, network, or communication protocol.

Having now described some illustrative embodiments of the invention, it should be apparent to those skilled in the art that the foregoing is merely illustrative and not limiting, having been presented by way of example only. Numerous modifications and other illustrative embodiments are within the scope of one of ordinary skill in the art and are contemplated as falling within the scope of the invention. In particular, while descriptions have been provided in terms of capturing facial movements, they are not limited to this context. The procedures are applicable to a wide variety of tracking problems.

Moreover, where examples presented herein involve specific combinations of method acts or system elements, it should be understood that those acts and those elements may be combined in other ways to accomplish the same objective of automatic measurement of facial expression. Acts, elements and features discussed only in connection with one embodiment are not intended to be excluded from a similar role in other embodiments.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. Additionally, single device features may fulfill the requirements of separately recited elements of a claim.

What is claimed is:

1. A computer implemented method for generating a non-transient record embodying a measure of a location of a feature of a face of a person, the method comprising:
   a. receiving a video sequence that constitutes a physical record of the face of a specified individual person;
   b. applying a feature locator update model to the video sequence, the feature locator update model derived by steps of:
      i. defining a set of training data consisting of training images with associated facial feature locations;
      ii. generating a set of facial feature displacements for each training image with associated image sample vectors; and
      iii. training a regularized linear regression which maps from image sample vectors to displacement vectors, wherein the regularized linear regression is characterized by regularization that includes a spatial smoothness term within the shape-free sample space; and
   c. extracting a feature location, based on the feature update model, characterizing the location of the feature of the face of the specified individual person; and
   d. storing the feature location to the non-transient record.

2. A computer-implemented method in accordance with claim 1, further comprising:

e. extracting a facial expression parameter, based on the feature update model, characterizing the expression of the feature of the face of the specified individual person; and f. storing the facial expression parameter to the non-transient record.

3. A computer-implemented method in accordance with claim 1, wherein the feature locator update model is trained on the basis of a plurality of human subjects.

4. A method in accordance with claim 3, wherein the feature locator update model is trained on the basis of calibration images of each of the plurality of human subjects.

5. A computer-implemented method in accordance with claim 4, further comprising:

a. training the feature locator update model from the plurality of subjects in such a manner as to incorporate information from calibration images of each of a plurality of subjects;

b. obtaining a calibration image of a specific subject;

c. tailoring the feature locator update model to the specific individual using the captured calibration image; and d. applying the tailored feature locator to the video sequence of the specified individual person.

6. A computer-implemented method, in accordance with claim 1, wherein the feature locator update model is derived using a further step of computing matrices representing the contribution of optical flow to an update equation using a set of annotated training images during an offline training phase.

7. A computer-implemented method, in accordance with claim 5, wherein the feature locator update model is derived using a further step of combining a vector of calibration samples said matrices to "bake" the optical flow calculation into the feature locator update model in such a manner as to retain an original computational cost.

8. A computer-implemented method in accordance with claim 1, the method further comprising:

a. creating a plurality of expression extractor containing controls representing both identity and expression variation;

b. fitting, in a fitting process, 3D pose, identity and expression parameters to features from a specified individual person in a calibration pose;

c. fixing a set of identity controls to produce a tailored person-specific expression extractor; and d. applying the above fitting process on a person-specific expression extract to the video sequence that constitutes a physical record of the face of a specified individual person to produce facial expression parameters, wherein the facial expression parameters represent facial feature locations which are uncontaminated by identity variation between individuals.

9. A computer-implemented method in accordance with claim 1, wherein the computer-implemented method is performed on a mobile device.

10. A computer-implemented method in accordance with claim 1, wherein the computer-implemented method is performed on a smart TV.

11. A computer-implemented method in accordance with claim 5, further comprising measuring an expression of the person in response to pre-rendered video footage.

12. A computer-implemented method in accordance with claim 5, further comprising measuring an expression of the person in response to dynamically rendered display content.

13. A computer-implemented method in accordance with claim 12, wherein the dynamically rendered display content includes a software display.

14. A computer-implemented method in accordance with claim 5, further comprising producing real-time pre-visualisation of character animation during performance capture in media generation.

15. A computer-implemented method in accordance with claim 5, further comprising creating video content containing avatar animation.

16. A computer-implemented method in accordance with claim 5, further comprising creating character animation in real-time.

17. A non-transitory computer readable medium for use on a computer system for storing computer-readable program code, the computer readable program code comprising:

a. a computer code module for receiving a video sequence that constitutes a physical record of the face of a specified individual person;

b. a computer code module for applying a feature locator update model to the video sequence;

c. a computer code module for defining a set of training data consisting of training images with associated facial feature locations;

d. a computer code module for generating a set of facial feature displacements for each training image with associated image sample vectors;

e. a computer code module for training a regularized linear regression which maps from image sample vectors to displacement vectors, wherein the regularized linear regression is characterized by regularization that includes a spatial smoothness term within the shape-free sample space, thereby generating the feature locator update model;

f. a computer code module for extracting a feature location, based on the feature update model, characterizing the location of the feature of the face of the specified individual person; and g. a computer code module for storing the feature location to a non-transient medium.

18. A non-transitory computer readable medium in accordance with claim 17, further comprising:

h. a computer code module for extracting a facial expression parameter, based on the feature update model, characterizing the expression of the feature of the face of the specified individual person; and i. a computer code module for storing the facial expression parameter to the non-transient record.

* * * * *